US008654036B2

(12) United States Patent
Takahashi et al.

(10) Patent No.: US 8,654,036 B2
(45) Date of Patent: Feb. 18, 2014

(54) DATA PROCESSING APPARATUS WHICH TRANSMITS DATA FOR DISPLAY TO EXTERNAL DISPLAY DEVICE, DATA OUTPUT METHOD, AND DATA OUTPUT PROGRAM

(75) Inventors: Kenichi Takahashi, Sennan-gun (JP); Mitsuzo Iwaki, Osaka (JP); Daisuke Sakiyama, Kawanishi (JP); Takeshi Minami, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1125 days.

(21) Appl. No.: 12/336,266

(22) Filed: Dec. 16, 2008

(65) Prior Publication Data

US 2009/0237326 A1    Sep. 24, 2009

(30) Foreign Application Priority Data

Mar. 18, 2008   (JP) .................................. 2008-68942

(51) Int. Cl.
*G06F 15/16*   (2006.01)
*H04N 7/15*   (2006.01)

(52) U.S. Cl.
USPC ................................. 345/2.1; 709/204; 726/4

(58) Field of Classification Search
USPC ......................................................... 345/2.1
See application file for complete search history.

(56) References Cited

U.S. PATENT DOCUMENTS

| 5,999,208 | A | * | 12/1999 | McNerney et al. | ........ | 348/14.08 |
| 2002/0169831 | A1 | | 11/2002 | Lee et al. | | |
| 2003/0103075 | A1 | * | 6/2003 | Rosselot | ........................ | 345/717 |
| 2007/0280646 | A1 | | 12/2007 | Seita et al. | | |

FOREIGN PATENT DOCUMENTS

| JP | 07-079288 | 3/1995 |
| JP | 7-111644 A | 4/1995 |
| JP | 2001-331430 | 11/2001 |
| JP | 2002-27421 A | 1/2002 |
| JP | 2005-051547 | 2/2005 |
| JP | 2007-068028 | 3/2007 |
| JP | 2007-312140 | 11/2007 |
| JP | 2007-324919 | 12/2007 |

OTHER PUBLICATIONS

Notice of Ground of Rejection issued in the corresponding Japanese Patent Application No. 2008-068942 dated Dec. 15, 2009, and an English Translation thereof.
Office Action (Notice of Allowance) dated Jan. 18, 2011, issued in the corresponding Japanese Patent Application No. 2008-068942, and an English Translation thereof.

* cited by examiner

*Primary Examiner* — Dorothy Harris
(74) *Attorney, Agent, or Firm* — Buchanan Ingersoll & Rooney PC

(57) ABSTRACT

In order to easily display data on a display device, an MFP connected to a plurality of television conference terminal devices each displaying data stores device information in an HDD for a respective one of the television conference terminal devices, to store a format in which the corresponding terminal device inputs data. The MFP includes a data acquiring portion to acquire data, an output destination accepting portion to accept an output destination of data, a conversion portion, when one of the television conference terminal devices is accepted as an output destination device which is the output destination of data, to convert a format of the acquired data to the format stored corresponding to the output destination device in the device information, and a communication control portion to output the data converted by the conversion portion to the output destination device.

30 Claims, 21 Drawing Sheets

F I G. 3
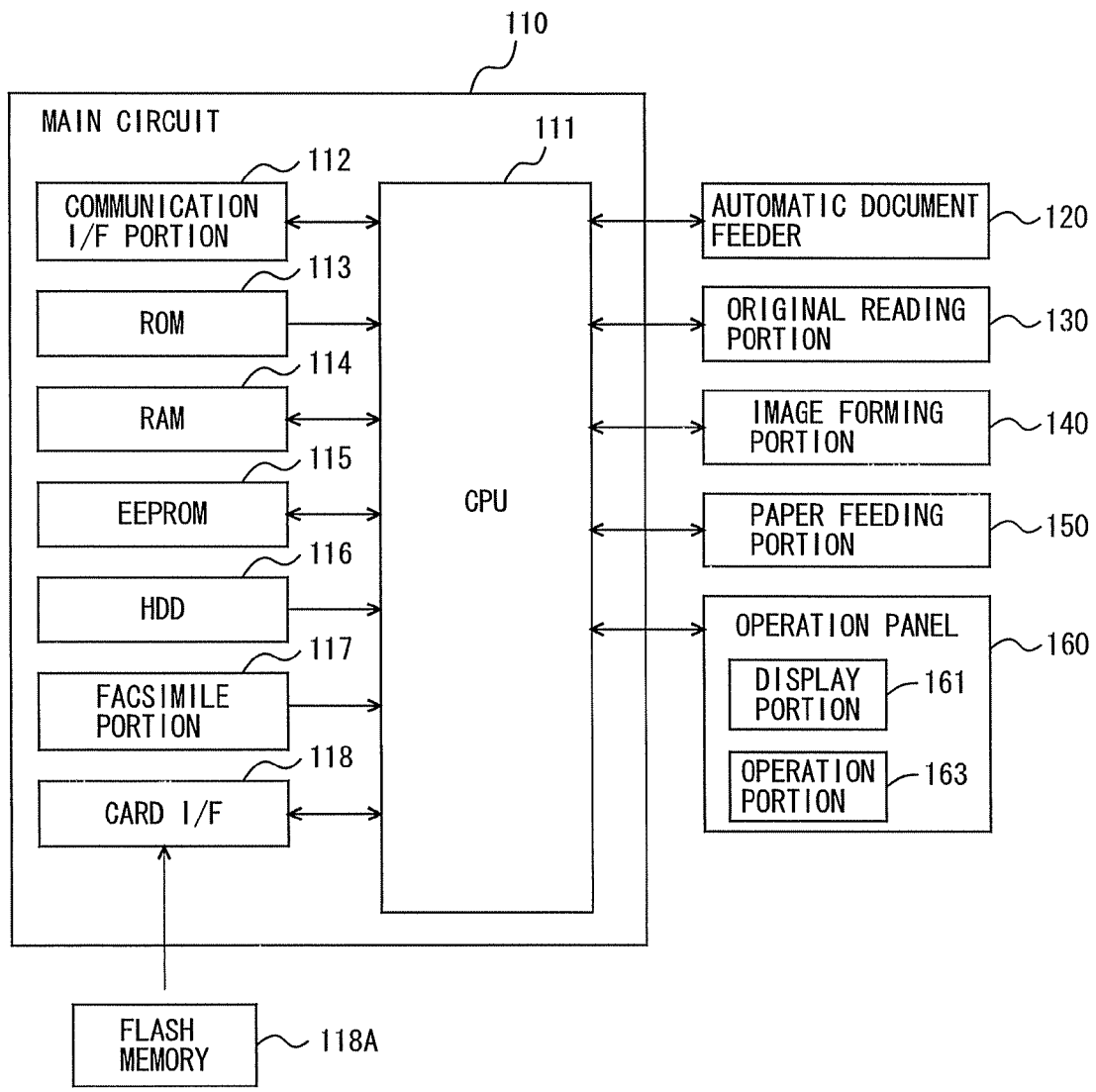

F I G. 7

| DEVICE NAME | SPECIFICATION | | TRANSMISSION-RELATED INFORMATION | | | | AUTHORIZED USER | INSTALLATION LOCATION |
|---|---|---|---|---|---|---|---|---|
| | TYPE | FORMAT | IP ADDRESS | DATA TRANSFER SYSTEM | PATH/MAIL ADDRESS | AUTHENTICATION KEY | | |
| TV CONFERENCE 1 | TV CONFERENCE SYSTEM | PDF | XX.XX.XX.01 | SMB | NETWORK PATH A | ****** | ALL USERS | CONFERENCE ROOM A |
| TV CONFERENCE 2 | TV CONFERENCE SYSTEM | JPEG | XX.XX.XX.02 | SMB | NETWORK PATH B | ****** | ALL USERS | CONFERENCE ROOM B |
| PROJECTOR 1 | PROJECTOR | JPEG | XX.XX.XX.03 | SMB | NETWORK PATH C | ****** | ALL USERS | MOVABLE |
| PC1 | PC | PDF | XX.XX.XX.04 | MAIL | MAIL ADDRESS A | ****** | USER A | MOVABLE |
| TV CONFERENCE 3 | TV CONFERENCE SYSTEM | PDF | XX.XX.XX.05 | SMB | NETWORK PATH D | ****** | ALL USERS | CONFERENCE ROOM C |
| ELECTRONIC SCREEN 1 | ELECTRONIC SCREEN | PDF | XX.XX.XX.06 | SMTP | MAIL ADDRESS B | ****** | ALL USERS | MOVABLE |
| ELECTRONIC PAPER 1 | ELECTRONIC PAPER | RAW | | Bluetooth | | ****** | USER B | MOVABLE |
| PDA1 | PDA | TIFF | | IrDA | | ****** | USER C | MOVABLE |
| MOBILE PHONE 1 | MOBILE PHONE | JPEG | | IrSimple | | ****** | USER D | MOVABLE |

F I G. 8

| JOB DISPLAY | | |
|---|---|---|
| SETTING CONTENTS | | |
| REGISTRATION SOURCE | CONDITION | |

PLEASE SELECT DESTINATION.    NUMBER OF DESTINATIONS 000    — 300

FROM REGISTERED DESTINATION | DIRECT INPUT | LDAP SEARCH | EXTERNAL DISPLAY DEVICE — 301

303: A | KA | SA | TA | NA | HA | MA | YA | RA WA | CONVERT TO ALPHABETIC CHARACTERS

COMMON USE

✉ E-mail tokyo    ✉ E-mail osaka    ☐ BOX box01    ☐ SMB SMB1    ☐ FTP FTP1    1/1

✉ E-mail nagoya    ✉ E-mail fukuoka    ☐ BOX box02    ☐ FTP FTP SHARED

⇧    ⇨                                                                    DESTINATION SEARCH

DELETE

SETTING FOR READING | SETTING FOR ORIGINALS | SETTING FOR COMMUNICATION
— 305 — 307 — 309

2006/10/19 16:33
AVAILABLE SPACE 100%

JOB DETAILS

EXTERNAL DEVICE SELECTION LIST

FORWARDING DESTINATION DEVICE LIST

| DEVICE NAME | TYPE | FORMAT | DATA TRANSFER SYSTEM | AUTHORIZED USER | INSTALLATION LOCATION |
|---|---|---|---|---|---|
| TV CONFERENCE 1 | TV CONFERENCE SYSTEM | PDF | SMB | ALL USERS | CONFERENCE ROOM A |
| TV CONFERENCE 2 | TV CONFERENCE SYSTEM | JPEG | SMB | ALL USERS | CONFERENCE ROOM B |
| PROJECTOR 1 | PROJECTOR | JPEG | SMB | ALL USERS | MOVABLE |
| PC1 | PC | PDF | MAIL | USER A | MOVABLE |
| TV CONFERENCE 3 | TV CONFERENCE SYSTEM | PDF | SMB | ALL USERS | CONFERENCE ROOM C |
| ELECTRONIC SCREEN 1 | ELECTRONIC SCREEN | PDF | SMTP | ALL USERS | MOVABLE |
| ELECTRONIC PAPER 1 | ELECTRONIC PAPER | RAW | Bluetooth | USER B | MOVABLE |
| PDA1 | PDA | TIFF | IrDA | USER C | MOVABLE |
| MOBILE PHONE 1 | MOBILE PHONE | JPEG | IrSimple | USER D | MOVABLE |

OK   CANCEL   HELP

FIG. 18

PLEASE SELECT DESTINATION.    NUMBER OF DESTINATIONS 000

| FROM REGISTERED DESTINATION | DIRECT INPUT | LDAP SEARCH | EXTERNAL DISPLAY DEVICE |

| | DEVICE NAME | TYPE | FORMAT | DATA TRANSFER SYSTEM | AUTHORIZED USER | INSTALLATION LOCATION |
|---|---|---|---|---|---|---|
| 323A | TV CONFERENCE 1 | TV CONFERENCE SYSTEM | PDF | SMB | ALL USERS | CONFERENCE ROOM A |
| 323B | TV CONFERENCE 2 | TV CONFERENCE SYSTEM | JPEG | SMB | ALL USERS | CONFERENCE ROOM B |
| 323C | PROJECTOR 1 | PROJECTOR | JPEG | SMB | ALL USERS | MOVABLE |
| 323D | PC1 | PC | PDF | MAIL | USER A | MOVABLE |
| 323E | TV CONFERENCE 3 | TV CONFERENCE SYSTEM | PDF | SMB | ALL USERS | CONFERENCE ROOM C |
| 323F | ELECTRONIC SCREEN 1 | ELECTRONIC SCREEN | PDF | SMTP | ALL USERS | MOVABLE |
| 323G | ELECTRONIC PAPER 1 | ELECTRONIC PAPER | RAW | Bluetooth | USER B | MOVABLE |
| 323H | PDA1 | PDA | TIFF | IrDA | USER C | MOVABLE |
| 323I | MOBILE PHONE 1 | MOBILE PHONE | JPEG | IrSimple | USER D | MOVABLE |

TRANSMIT    EXTERNAL DISPLAY BOX    DEVICE REGISTRATION

2006/10/19 16:33
AVAILABLE MEMORY 100%

JOB DISPLAY
SETTING CONTENTS
REGISTRATION SOURCE | CONDITION

DELETE
JOB DETAILS
Y☐ M☐ C☐ K☐

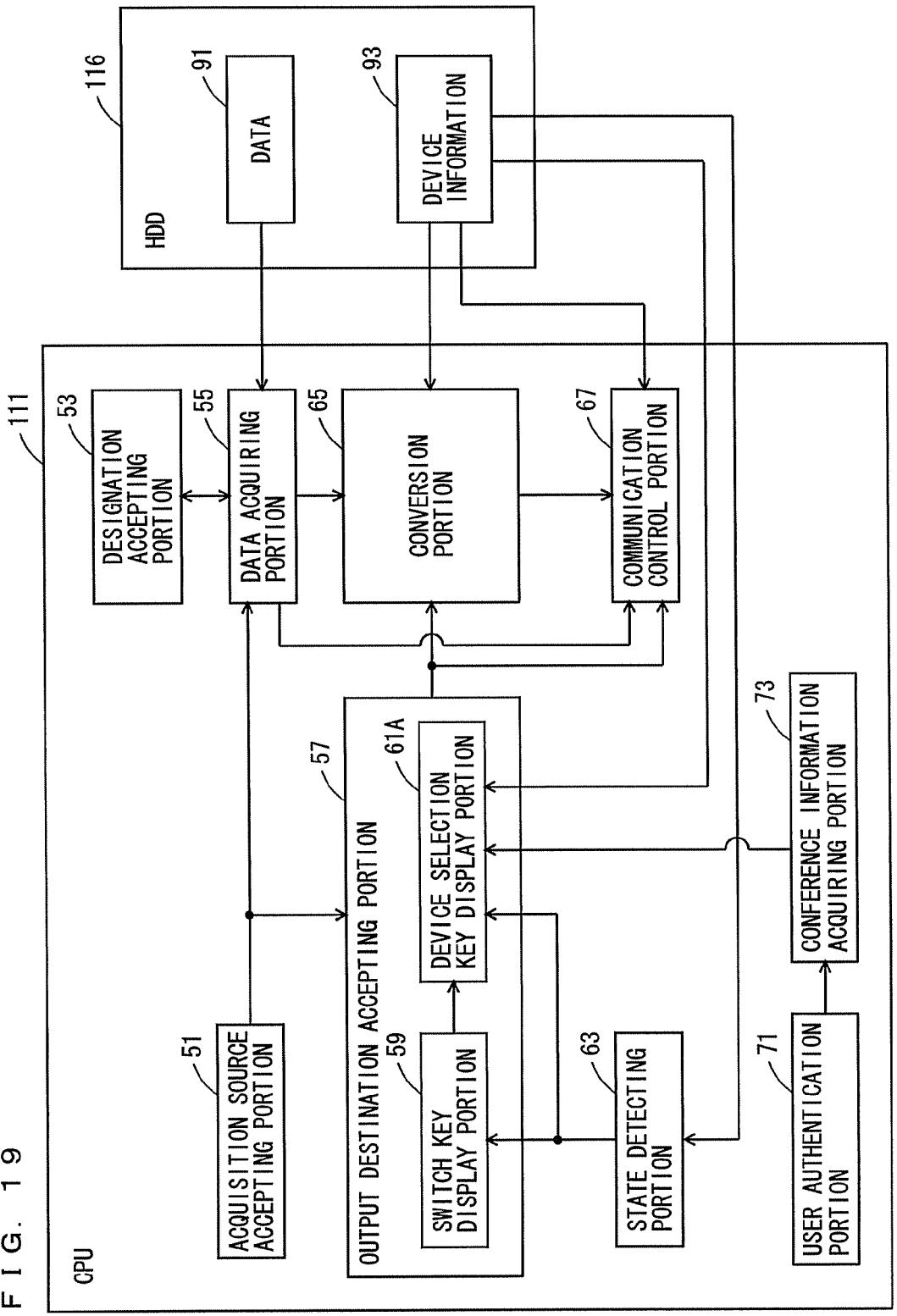

F I G. 2 0

CONFERENCE INFORMATION

| CONFERENCE NAME | CONFERENCE ROOM NAME | PARTICIPANT USER IDENTIFICATION INFORMATION |
|---|---|---|

DATA PROCESSING APPARATUS WHICH TRANSMITS DATA FOR DISPLAY TO EXTERNAL DISPLAY DEVICE, DATA OUTPUT METHOD, AND DATA OUTPUT PROGRAM

This application is based on Japanese Patent Application No. 2008-68942 filed with Japan Patent Office on Mar. 18, 2008, the entire content of which is hereby incorporated by reference.

BACKGROUND OF THE INVENTION

1. Field of the Invention

The present invention relates to a data processing apparatus, a data output method, and a data output program embodied on a computer readable medium. More particularly, the present invention relates to a data processing apparatus which transmits data for display to an external display device, a data output method carried out by the data processing apparatus, and a data output program embodied on a computer readable medium and for causing a computer to execute the method.

2. Description of the Related Art

When a display device such as a projector is used for a conference or the like, data of the documents for the conference may be displayed on a display device during the conference. In such a case, a presenter prestores the data in a personal computer (PC) and transmits the data from the PC to the display device to cause it to be displayed on the display device. If the data in the electronic form is not stored in the PC, however, for example when paper documents are provided to the participants, the documents cannot be displayed on the display device.

Japanese Patent Application Laid-Open No. 7-111644 discloses a television conference system provided with an interface that can be connected to a facsimile machine as an input/output device. Japanese Patent Application Laid-Open No. 2002-027421 discloses a television conference system which is configured to be connected to an image input device such as a digital camera.

In the conventional television conference systems, a data input device of a single type is prepared, so that it is only necessary for the display device to display data of a single type of format input into the system. In contrast, for example in the case where data of a plurality of types of formats are input to an input device, it is not possible to input data in the format in which the display device can display data, in which case the data cannot be displayed on the display device.

SUMMARY OF THE INVENTION

The present invention has been accomplished in view of the foregoing problems, and an object of the present invention is to provide a data processing apparatus capable of easily displaying data on a display device.

Another object of the present invention is to provide a data output method enabling easy display of data on a display device.

A further object of the present invention is to provide a data output program enabling easy display of data on a display device.

In order to achieve the above-described objects, according to an aspect of the present invention, a data processing apparatus is connected to a plurality of display devices displaying data, and includes: a device information storage portion to store, for a respective one of the plurality of display devices, specification of data in accordance with which the corresponding display device can display data; a data acquiring portion to acquire data; an output destination accepting portion to accept an output destination of data; a conversion portion, when one of the plurality of display devices is designated as an output destination device which is the output destination of data, to convert specification of the acquired data to the specification stored for the output destination device in the device information storage portion; and an output portion to output the data converted by the conversion portion to the output destination device.

According to another aspect of the present invention, a data processing apparatus is connected to a display device displaying images, and includes: a device information storage portion to store, for the display device, specification of data in accordance with which the display device can display data; a selection portion to select one of a plurality of data sources; a data acquiring portion to acquire data from the selected one of the plurality of data sources; an output destination accepting portion to accept an output destination of data; a conversion portion, when the display device is accepted as the output destination of data, to convert specification of the acquired data to the specification stored for the display device in the device information storage portion; and an output portion to output the data converted by the conversion portion to the display device.

According to a further aspect of the present invention, a data output method is carried out by a data processing apparatus connected to a plurality of display devices displaying images, the data processing apparatus including a device information storage portion to store, for a respective one of the plurality of display devices, specification of data in accordance with which the corresponding display device can display data, wherein the method includes the steps of: acquiring data; accepting an output destination of data; in the case where one of the plurality of display devices is designated as an output destination device which is the output destination of data, converting specification of the acquired data to the specification stored corresponding to the output destination device; and outputting the converted data to the output destination device.

According to a still further aspect of the present invention, a data output method is carried out by a data processing apparatus connected to a display device displaying images, the data processing apparatus including a device information storage portion to store, for the display device, specification of data in accordance with which the display device can display data, wherein the method includes the steps of: accepting selection of one of a plurality of data sources; acquiring data from the selected one of the plurality of data sources; accepting an output destination of data; in the case where the display device is accepted as the output destination of data, converting specification of the acquired data to the specification stored corresponding to the display device; and outputting the converted data to the display device.

According to yet another aspect of the present invention, a data output program embodied on a computer readable medium is executed by a computer controlling a data processing apparatus connected to a plurality of display devices displaying images, the data processing apparatus including a device information storage portion to store, for a respective one of the plurality of display devices, specification of data in accordance with which the corresponding display device can display data, wherein the program causes the computer to execute the steps of: acquiring data; accepting an output destination of data; in the case where one of the plurality of display devices is designated as an output destination device which is the output destination of data, converting specification of the acquired data to the specification stored corresponding to the output destination device; and outputting the converted data to the output destination device.

According to yet another aspect of the present invention, a data output program embodied on a computer readable medium is executed by a computer controlling a data processing apparatus connected to a display device displaying images, the data processing apparatus including a device information storage portion to store, for the display device, specification of data in accordance with which the display device can display data, wherein the program causes the computer to execute the steps of: accepting selection of one of a plurality of data sources; acquiring data from the selected one of the plurality of data sources; accepting an output destination of data; in the case where the display device is accepted as the output destination of data, converting specification of the acquired data to the specification stored corresponding to the display device; and outputting the converted data to the display device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing an example of the hardware configuration of the MFP.

FIG. 7 shows an example of the format of a device record included in device information.

FIG. 8 shows an example of an output destination setting screen.

FIG. 16 shows an example of a print designation screen.

FIG. 17 shows an example of a display device designation screen displayed on a PC.

FIG. 18 shows an example of the display device designation screen according to a first modification.

FIG. 19 is a functional block diagram showing an example of the functions of the CPU provided in the MFP in a second modification, together with information stored in the HDD.

FIG. 20 shows an example of the format of conference information.

DESCRIPTION OF THE PREFERRED EMBODIMENTS

Figure 1:
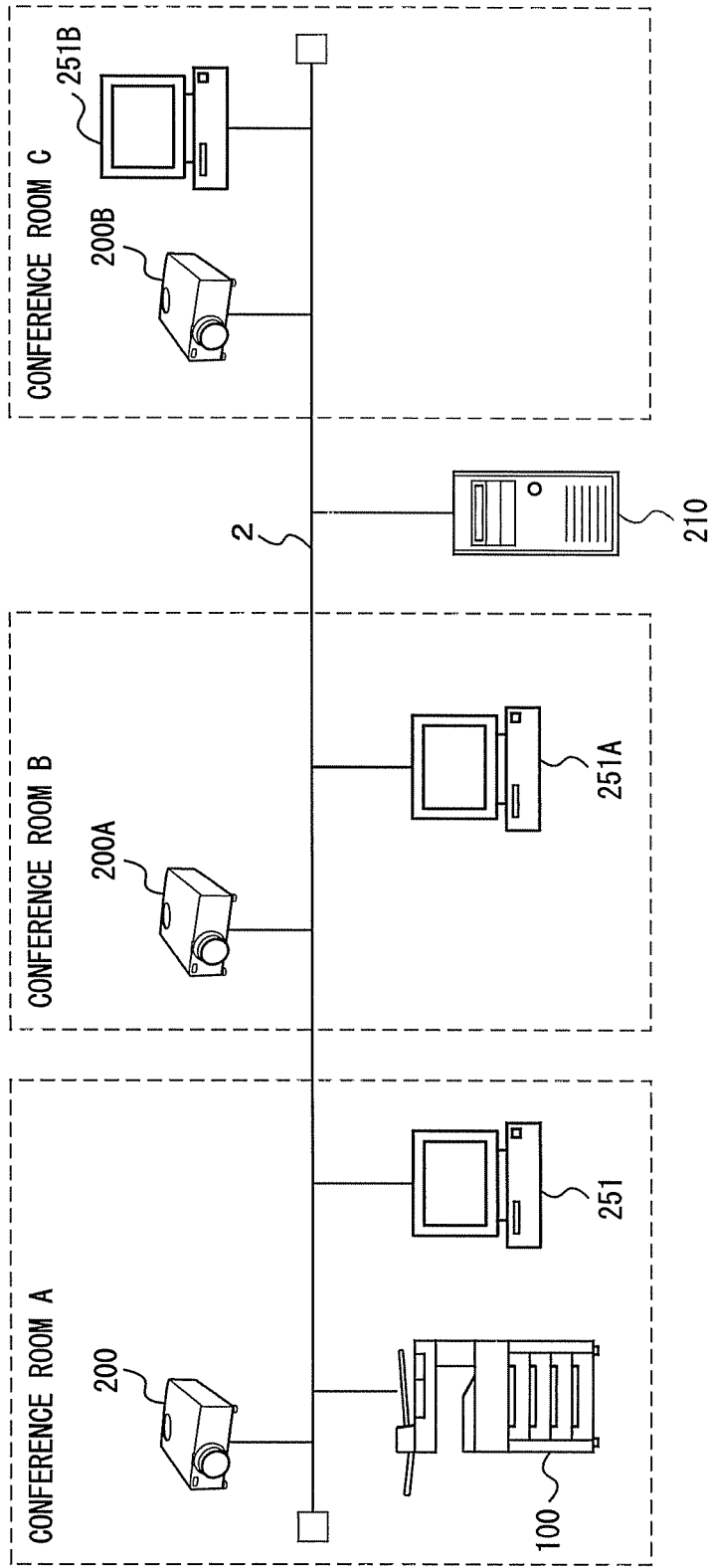
FIG. 1 schematically shows a television conference system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows a television conference system according to an embodiment of the present invention. Referring to FIG. 1, a television conference system 1 is arranged in conference rooms A, B, and C, which are spaces physically distant from each other and through which a network 2 is placed. In conference room A, an MFP (Multi Function Peripheral) 100, a terminal device 200 for television conference (hereinafter, referred to as the "television conference terminal device") serving as a display device, and a personal computer (PC) 251 are provided, which are each connected to network 2. In conference room B, a television conference terminal device 200A and a PC 251A are provided, each connected to network 2. In conference room C, a television conference terminal device 200B and a PC 251B are provided, each connected to network 2. Television conference system 1 further includes an email server 210 for transmitting/receiving emails, which is also connected to network 2.

Network 2 is a local area network (LAN), which may be connected in a wired or wireless manner. Further, not limited to the LAN, network 2 may be a wide area network (WAN), public switched telephone networks (PSTN), the Internet, or the like. MFP 100 is able to communicate with television conference terminal devices 200, 200A, 200B, PCs 251, 251A, 251B, and email server 210, via network 2.

While MFP 100 is described as an example of the data processing apparatus in the present embodiment, not limited to MFP 100, the data processing apparatus may be a scanner, printer, facsimile machine, computer, or the like. Further, while the arrangement of three physically distant spaces of conference rooms A, B, and C is shown by way of example, the number of spaces is not limited thereto; one conference room may be provided, or a set of at least two conference rooms may be selected from among a plurality of rooms, for arrangement of the system.

Figure 2:
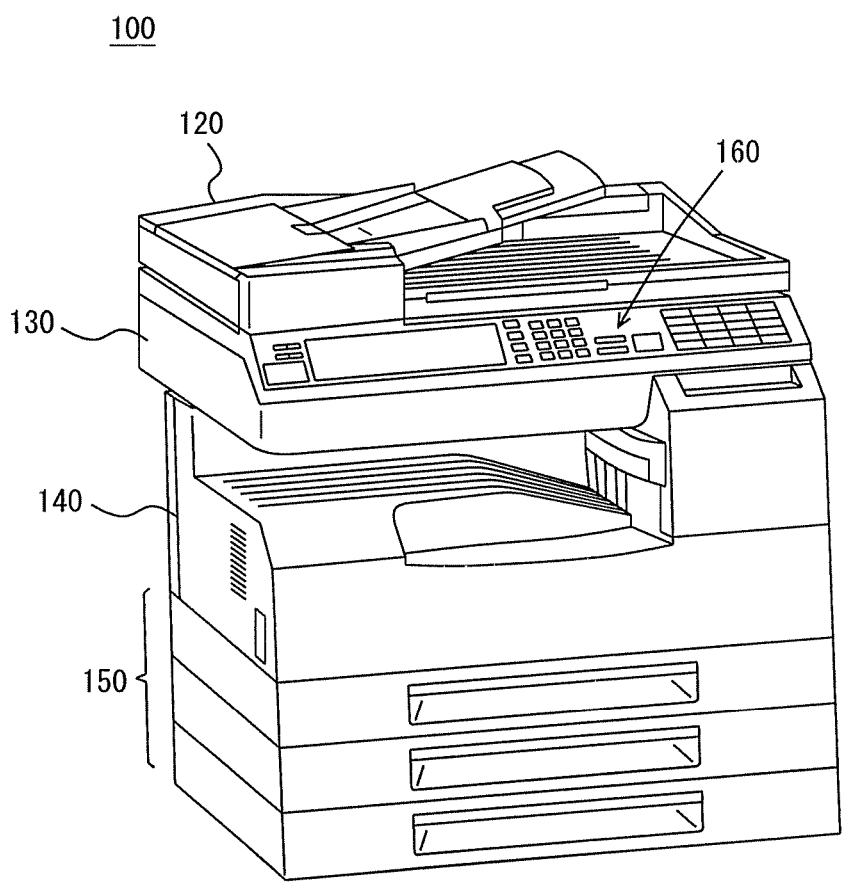
FIG. 2 is a perspective view of an MFP.

FIG. 2 is a perspective view of the MFP, and FIG. 3 is a block diagram showing an example of the hardware configuration of the MFP. Referring to FIGS. 2 and 3, MFP 100 includes: a main circuit 110; an original reading portion 130 which reads an image formed on an original; an automatic document feeder 120 which delivers an original to original reading portion 130; an image forming portion 140 which forms, on a sheet of paper or the like, a still image output from original reading portion 130 that read an original; a paper feeding portion 150 which supplies sheets of paper to image forming portion 140; and an operation panel 160 serving as a user interface. Main circuit 110 includes a central processing unit (CPU) 111, a communication interface (I/F) portion 112, a ROM (Read Only Memory) 113, a RAM (Random Access Memory) 114, an EEPROM (Electronically Erasable and Programmable ROM) 115, a hard disk drive (HDD) 116 as a mass storage, a facsimile portion 117, and a card interface (I/F) 118 mounted with a flash memory 118A. CPU 111 is connected with automatic document feeder 120, original reading portion 130, image forming portion 140, paper feeding portion 150, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores still images continuously transmitted from original reading portion 130.

Operation panel 160 is provided on an upper surface of MFP 100, and includes a display portion 161 and an operation portion 163. Display portion 161 is a display such as a liquid crystal display (LCD), an organic electro-luminescence display (ELD) or the like, and displays an instruction menu for the user, information about acquired image data, and others. Operation portion 163 is provided with a plurality of keys, and accepts input of data such as instructions, characters and numerical characters, according to the key operations of the user. Operation portion 163 further includes a touch panel provided on display portion 161.

Communication I/F portion 112 is an interface for connecting MFP 100 to network 2. CPU 111 communicates with television conference terminal devices 200, 200A, 200B, PCs 251, 251A, 251B, and email server 210 via communication I/F portion 112, for transmission/reception of data. Further, communication I/F portion 112 is capable of communicating with a computer connected to the Internet via network 2. Communication I/F portion 112 may communicate using a communication protocol of FTP (File Transfer Protocol), UDP (User Datagram Protocol), SMB (Server Message Block), SMTP (Simple Main Transfer Protocol), Bluetooth®, IrDA (Infrared Data Association), IrSimple, or the like, although the protocol for communication I/F portion 112 is not limited thereto.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received from facsimile portion 117 on a sheet of paper. Further, facsimile portion 117 converts the data stored in HDD 116 to facsimile data, and transmits it to a facsimile machine connected to the PSTN.

Card I/F 118 is mounted with flash memory 118A. CPU 111 is capable of accessing flash memory 118A via card I/F 118. CPU 111 loads a program recorded on flash memory 118A mounted to card I/F 118, to RAM 114 for execution. It is noted that the program executed by CPU 111 is not restricted to the program recorded on flash memory 118A. CPU 111 may load a program stored in HDD 116 to RAM 114 for execution. In this case, another computer connected to network 2 may rewrite the program stored in HDD 116 of MFP 100 or may additionally write a new program. Further, MFP 100 may download a program from another computer connected to network 2, and store the program in HDD 116. As used herein, the "program" includes, not only the program directly executable by CPU 111, but also a source program, a compressed program, an encrypted program, and others.

Figure 4:
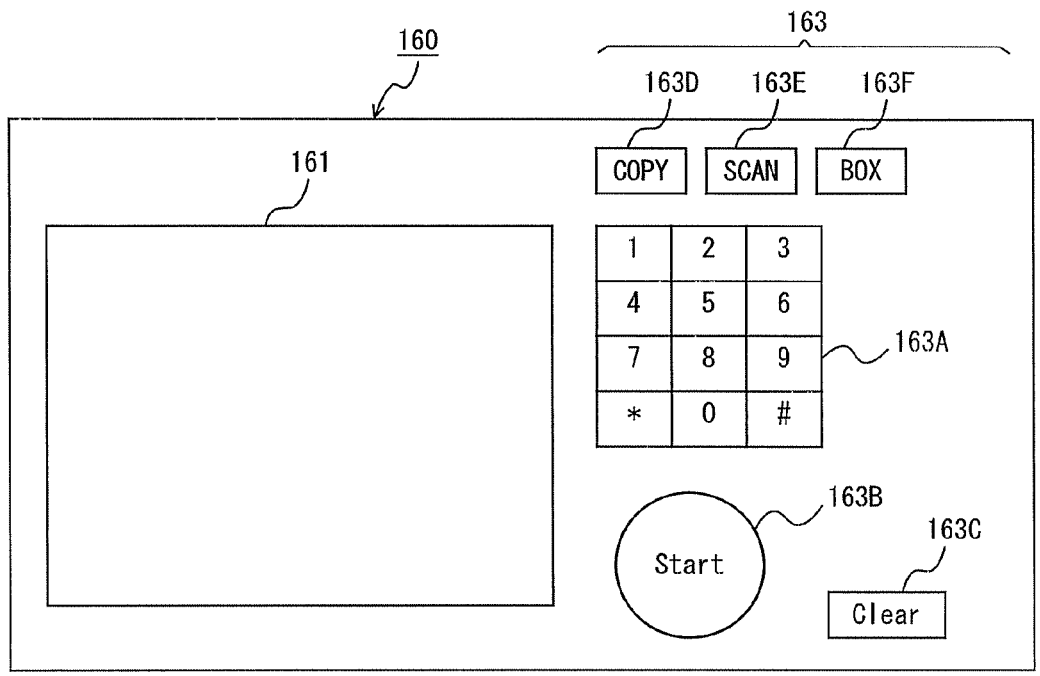
FIG. 4 is a plan view showing an example of an operation panel.

FIG. 4 is a plan view showing an example of the operation panel. Referring to FIG. 4, operation panel 160 includes a display portion 161 and an operation portion 163. Operation portion 163 includes ten keys 163A, a start key 163B, a clear key 163C for canceling an input content, a copy key 163D for causing MFP 100 to enter a copy mode for execution of copying processing, a scan key 163E for causing MFP 100 to enter a scan mode for execution of scanning processing, and a BOX key 163F for causing MFP 100 to enter a data transmission mode for execution of data transmitting processing.

Figure 5:
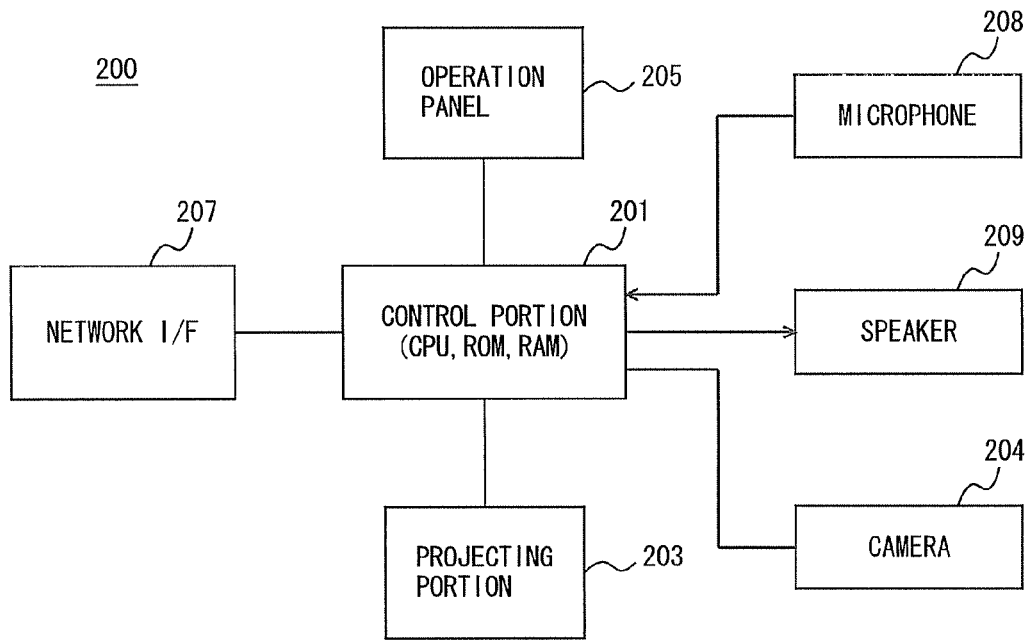
FIG. 5 is a functional block diagram showing an example of the functions of a television conference terminal device.

Television conference terminal devices 200, 200A, and 200B are identical in configuration and function, and thus, television conference terminal device 200 will be described representatively. FIG. 5 is a functional block diagram showing an example of the functions of the television conference terminal device. Referring to FIG. 5, television conference terminal device 200 serving as the display device includes: a control portion 201 which is responsible for overall control of television conference terminal device 200, a network I/F 207 which connects television conference terminal device 200 to network 2, an operation panel 205, a projecting portion 203 which projects an image, a camera 204 which picks up images in the conference room, a microphone 208 which picks up sound, and a speaker 209 for output of sound.

Camera 204 picks up images in conference room A, and outputs the obtained video data to control portion 201. Microphone 208 collects sound, and outputs the audio data to control portion 201.

Control portion 201 includes a CPU, a RAM used as a work area, and a ROM storing a program to be executed by the CPU. Control portion 201 transmits the video data input from camera 204 and the audio data input from microphone 208 to other television conference terminal devices 200A and 200B via network I/F 207.

Further, control portion 201 converts the format of the video data received from other television conference terminal devices 200A and 200B via network I/F 207, into the one for projecting, and outputs the projecting data to projecting portion 203. It also outputs the audio data received from other television conference terminal devices 200A and 200B to speaker 209.

Projecting portion 203 is provided with a liquid crystal display, lens, and light source. The liquid crystal display displays the data input from control portion 201. The light emitted from the light source transmits through the liquid crystal display and is externally irradiated via the lens. When the light irradiated from projecting portion 203 reaches a screen, a magnified image of the image displayed on the liquid crystal display is thrown on the screen. It is noted that a wall having a highly reflective surface may be used instead of the screen, in which case installation of the screen is unnecessary. Operation panel 205 constitutes a user interface, and has a display portion such as a liquid crystal display, and an operation portion provided with a plurality of keys.

While it is assumed that television conference terminal devices 200, 200A, and 200B each have projecting portion 203 by way of example, projecting portion 203 may be replaced with a display such as an LCD, organic ELD, or the like.

Figure 6:
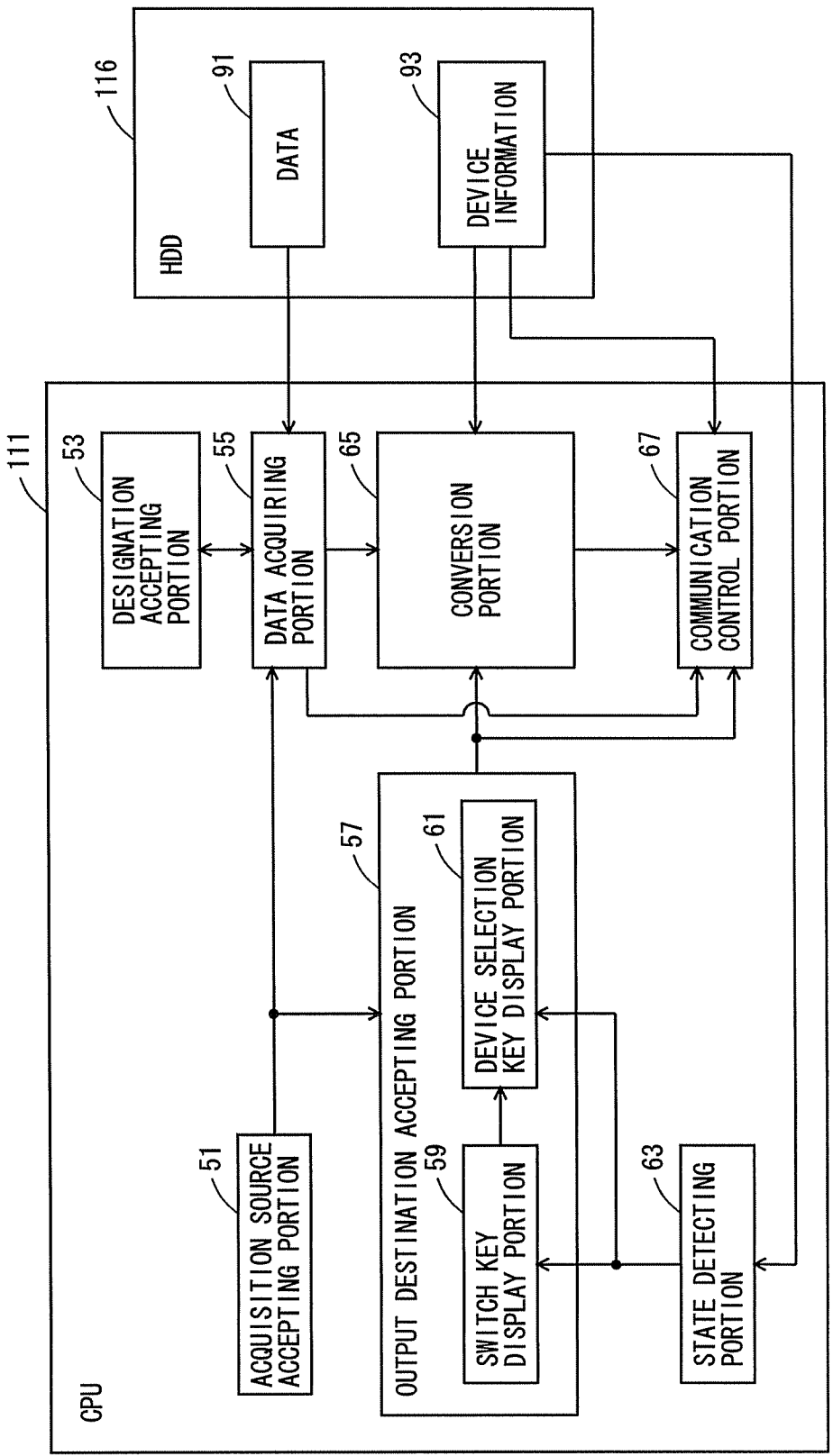
FIG. 6 is a functional block diagram showing an example of the functions of a CPU provided in the MFP, together with information stored in an HDD.

FIG. 6 is a functional block diagram showing an example of the functions of the CPU provided in the MFP, together with the information stored in the HDD. HDD 116 provided in MFP 100 in the present embodiment prestores data 91 and device information 93. Device information 93 will now be described. The device information includes device records for the respective display devices.

FIG. 7 shows an example of the format of the device record included in the device information. Referring to FIG. 7, the device record includes the fields of: device name, type, specification, transmission-related information, authorized user, and installation location.

The device name is the name assigned to the display device. The type refers to the type of the display device, which here is one of the following: projector, PC, TV conference system, electronic screen, electronic paper, PDA (Personal Digital Assistant), and mobile phone. The specification indicates the format of data in which the display device can input data. The data format includes: PDF (Portable Document Format), JPEG (Joint Photographic Experts Group), BMP (bit map), TIFF (Tagged Image File Format), GIF (Graphic Interchange Format), and the like.

The transmission-related information is the information for use in transmitting data to the display device, which includes the fields of: IP address, data transfer system, path/mail address, and authentication key. In the IP address field, information regarding the position on network 2 assigned to the display device is set, which is an IP (Internet Protocol) address in this example. In the field of data transfer system, the communication protocol for use in transmitting data to the display device is set, which is, e.g., SMB, SMTP, Bluetooth®, IrDA, or IrSimple. In the field of path/mail address, the path on network 2 to the display device is set in the case where the data transfer system is other than SMTP, and the email address assigned to the display device is set in the case where the data transfer system is SMTP. In the field of authentication key, authentication information for communication with the display device is set, which is a password prestored in the display device in this example.

In the field of authorized user, information regarding the users accessible to the display device is set, which is user identification information for identification of all or specific users. In the figure, the user identification information is shown as user A, user B, user C, and user D.

In the field of installation location, information regarding the location where the display device is installed is set, which is the name of conference room A, B, or C, or "movable" in this example. The name of conference room A, B, or C set in the field of installation location indicates that the display device is installed in the location designated by the name, while "movable" set in the field indicates that the location for installation of the display device is not fixed.

Here, television conference terminal devices 200, 200A, and 200B are assigned the device names "TV conference 1", "TV conference 2", and "TV conference 3", respectively. It is noted that the device record may include only the fields of device name, specification, IP address, data transfer system, and path/mail address, although it is unnecessary to set the network path if it can be specified by the IP address.

Returning to FIG. 6, CPU 111 provided in MFP 100 includes: an acquisition source accepting portion 51 to accept the acquisition source of data; a designation accepting portion 53 to accept designation of the data to be acquired; a data acquiring portion 55 to acquire data; a state detecting portion 63 to detect a state of an output destination of data; an output destination accepting portion 57 to accept the output destination of data; a conversion portion 65 to convert data; and a communication control portion 67 to output data.

Acquisition source accepting portion 51 accepts the acquisition source of data. When the user designates scan key 163E provided in operation portion 163, acquisition source accepting portion 51 accepts original reading portion 130 as the acquisition source of data from operation portion 163, and outputs an instruction to acquire data from original reading portion 130 to data acquiring portion 55 and output destination accepting portion 57. When the user designates BOX key 163F provided in operation portion 163, acquisition source accepting portion 51 accepts from operation portion 163 HDD 116 as the acquisition source of data, and outputs an instruction to acquire data from HDD 116 to data acquiring portion 55 and output destination accepting portion 57. Further, in the case where communication I/F portion 112 externally receives data, acquisition source accepting portion 51 outputs an instruction to acquire data from communication I/F portion 112 to data acquiring portion 55.

Data acquiring portion 55 acquires data from the acquisition source according to the instruction input from acquisition source accepting portion 51, and outputs the acquired data to conversion portion 65. In the case where the instruction to acquire data from original reading portion 130 is input, data acquiring portion 55 causes original reading portion 130 to read an image of an original, and acquires from original reading portion 130 the data that original reading portion 130 outputs by reading the image of the original.

In the case where the instruction to acquire data from HDD 116 is input, data acquiring portion 55 acquires data by reading the data specified by a file name input from designation accepting portion 53 among the data stored in HDD 116. Designation accepting portion 53 displays a designation accepting screen including the file names of data 91 stored in HDD 116 on display portion 161, and when the user inputs an instruction to select the displayed file name to operation portion 163, it accepts the selected file name from operation portion 163. Designation accepting portion 53 then outputs the selected file name to data acquiring portion 55.

Further, in the case where the instruction to acquire data from communication I/F portion 112 is input, data acquiring portion 55 acquires from communication I/F portion 112 the data it receives from the outside. The data that the communication I/F portion 112 receives from the outside may include: print data and image data received from PCs 251, 251A, and 251B connected to network 2; and an email received from email server 210. MFP 100 is pre-assigned an email address, and receives the email addressed to MFP 100 from email server 210. When the instruction to acquire data from communication I/F portion 112 is input, data acquiring portion 55 also acquires from communication I/F portion 112 the device name of the output destination device that the communication I/F portion 112 receives together with the data, and outputs the acquired device name to communication control portion 67.

State detecting portion 63 detects the state of the output destination of data, and outputs the state of each output destination to output destination accepting portion 57. Specifically, it reads device information 93 stored in HDD 116, transmits a signal based on PING (Packet INternet Groper) (hereinafter, referred to as the "PING signal") to the IP address included in the device record via communication I/F portion 112, and determines whether there is a reply. State detecting portion 63 determines whether the display device assigned the IP address to which the PING signal was transmitted is able to communicate or not, according to presence/absence of the reply to the PING signal. Further, state detecting portion 63 determines that, if the display device is able to communicate, it is in the state capable of displaying data with the power turned ON.

When communication I/F portion 112 receives a reply, state detecting portion 63 outputs to output destination accepting portion 57 an active state signal indicating that the display device assigned the IP address to which the PING signal was transmitted is in the state ready to display data. If communication I/F portion 112 does not receive a reply, state detecting portion 63 outputs to output destination accepting portion 57 an inactive state signal indicating that the display device assigned the IP address to which the PING signal was transmitted is in the state not ready to display data. Instead of using the PING signal, state detecting portion 63 may communicate with the display device to receive MIB (Management Information Base) information, for example, to determine whether the display device is in the state ready to display data.

State detecting portion 63 sequentially reads all the device records included in device information 93 to detect the states of all the display devices registered in device information 93, and outputs status signals (active or inactive state signals) indicating the respective states of all the display devices to output destination accepting portion 57. The status signal is the signal associating the IP address of the display device with its state. The state indicates whether the display device is in the state ready to display data.

Output destination accepting portion 57 includes a switch key display portion 59 and a device selection key display portion 61, and accepts the output destination of data. Specifically, when an instruction to acquire data from original reading portion 130 or an instruction to acquire data from HDD 116 is input from acquisition source accepting portion 51, output destination accepting portion 57 displays an output destination setting screen on display portion 161. The output destination setting screen is the screen for accepting the destination where the data acquired by data acquiring portion 55 is to be output. Switch key display portion 59 uses the status signals input from state detecting portion 63 to determine whether there is any display device which is in the state ready to display data. On the condition that there is at least one display device in the state ready to display data, switch key display portion 59 displays on display portion 161 a switch key for displaying a display device designation screen. On the other hand, if there is no display device in the state ready to display data, switch key display portion 59 does not display on display portion 161 the switch key for displaying the display device designation screen. This prevents the display device designation screen from being displayed, to thereby prevent the user's false operation. Here, it is assumed by way of example that the switch key for switching the screen to the display device designation screen is displayed within the output destination setting screen.

In the state where the switch key is displayed in the output destination setting screen, when the user inputs an operation to designate the switch key to operation portion 163, device selection key display portion 61 accepts from operation portion 163 an instruction to switch to the display device designation screen. Upon acceptance of the instruction to switch to the display device designation screen from operation portion 163, device selection key display portion 61 generates a display device designation screen based on the states of the display devices input from state detecting portion 63, and displays the display device designation screen on display portion 161. Specifically, device selection key display portion 61 reads device information 93 from HDD 116 to extract any device record including the IP address of the display device which is in the state ready to display data in accordance with the status signals input from state detecting portion 63, and displays the display device designation screen including the device names included in such device records. This allows the user to select the display device in the state ready to display data. Since the display device designation screen does not include the device name of the display device which is not in the state ready to display data, it is possible to prevent the display device not ready to display data from being erroneously designated by the user.

When the user inputs to operation portion 163 an operation of selecting at least one of the device names included in the display device designation screen, output destination accepting portion 57 displays a transmission key on display portion 161. If no device name is selected, the transmission key is not displayed, which prevents the user from erroneously designating the transmission key. Further, displaying the transmission key can inform the user of the operation to be performed next. The transmission key is an output key for accepting the instruction to transmit data to the display device corresponding to the selected device name. When the user inputs to operation portion 163 an operation to designate the transmission key, output destination accepting portion 57 outputs the selected device name to conversion portion 65 and communication control portion 67.

Conversion portion 65 converts the data input from data acquiring portion 55 to data that can be received by the display device specified by the device name input from output destination accepting portion 57, and outputs the converted data to communication control portion 67. Specifically, the device record containing the device name input from output destination accepting portion 57 is extracted from the device records included in device information 93 stored in HDD 116. Then, conversion portion 65 converts the format of data input from data acquiring portion 55 to the format specified by the specification contained in the extracted device record, and outputs the data having the format converted, to communication control portion 67. If the format of the data input from data acquiring portion 55 is identical to the one specified by the specification contained in the extracted device record, conversion portion 65 outputs the data input from data acquiring portion 55 to communication control portion 67 without performing the format conversion.

Communication control portion 67 controls communication I/F portion 112 to transmit the data input from conversion portion 65 to the display device specified by the device name input from output destination accepting portion 57. Specifically, the device record containing the device name input from output destination accepting portion 57 is extracted from the device records included in device information 93 stored in HDD 116. Then, communication control portion 67 controls communication I/F portion 112 to transmit the data input from conversion portion 65, in accordance with the transmission-related information contained in the extracted device record. The transmission-related information includes the IP address, data transfer system, network path or email address, and authentication key. Thus, communication control portion 67 transmits the data in accordance with the data transfer system. More specifically, in the case where the data transfer system is FTP or SMB, communication control portion 67 causes communication I/F portion 112 to transmit the data to the IP address. In the case where the data transfer system is SMTP, it generates an email which includes the data input from conversion portion 65 and which has the email address contained in the extracted device record set as the destination, and causes communication I/F portion 112 to transmit the generated email to email server 210. In the case where the data transfer system is Bluetooth®, IrDA, or IrSimple, communication control portion 67 causes communication I/F portion 112 to transmit the data according to the network path.

In this manner, data is transmitted to the display device specified by the device name accepted in output destination accepting portion 57, in the format in which the display device is able to receive data, and using the communication protocol in accordance with which the display device is able to communicate. This enables the display device to surely receive and display the data.

FIG. 8 shows an example of the output destination setting screen. Referring to FIG. 8, an output destination setting screen 300 includes an area 303 for designating an output destination, and switch keys 301, 305, 307, and 309. Switch key 301 is for displaying a display device designation screen. When the user designates switch key 301, device selection key display portion 61 accepts from operation portion 163 an instruction to display the display device designation screen. Switch key 301 is displayed by switch key display portion 59 on the condition that there is at least one display device in the state ready to display data. If there is no display device in the state ready to display data, switch key 301 is not displayed.

In area 303, output destination names for identification of the output destinations are displayed. When the user designates an output destination name, output destination accepting portion 57 accepts the designated output destination name from operation portion 163, and determines the output destination corresponding to the accepted output destination name. The output destination includes the area allocated in HDD 116, a transmission destination of email, and a transmission destination of data. The processing to be performed in the case where the output destination name displayed on area 303 is designated corresponds to either the processing of storing data in the area in HDD 116 determined as the output destination or the processing of transmitting data to the transmission destination determined as the output destination. Such processing is conventionally well-known and, thus, description thereof will not be provided here.

Switch key 305 is for switching the screen to a read setting screen. When the user designates switch key 305, output destination accepting portion 57 accepts an instruction to switch to the read setting screen from operation portion 163, and displays a read setting screen on display portion 161. The read setting screen is the screen for setting the conditions for original reading portion 130 to read an image of an original. When the user inputs a read condition to operation portion 163 according to the read setting screen, output destination accepting portion 57 provided in CPU 111 accepts the read condition, and outputs the accepted read condition to data acquiring portion 55. Data acquiring portion 55 controls original reading portion 130 to read the image of the original according to the read condition input from output destination accepting portion 57.

Switch key 307 is for switching the screen to an originals setting screen. When the user designates switch key 307, output destination accepting portion 57 accepts an instruction to switch to an originals setting screen from operation portion 163, and displays the originals setting screen on display portion 161. The originals setting screen is the screen for performing setting for the originals read by original reading portion 130. When the user inputs the setting for originals to operation portion 163 according to the originals setting screen, output destination accepting portion 57 provided in CPU 111 accepts the setting for originals, and outputs the accepted setting for originals to data acquiring portion 55. Data acquiring portion 55 controls original reading portion 130 to read the images of the originals according to the setting for originals input from output destination accepting portion 57.

Switch key 309 is for switching the screen to a communication setting screen. When the user designates switch key 309, output destination accepting portion 57 accepts an instruction to switch to a communication setting screen from operation portion 163, and displays the communication setting screen on display portion 161. The communication setting screen is the screen for setting the conditions for communication I/F portion 112 to transmit data. When the user inputs a transmission condition to operation portion 163 according to the communication setting screen, output destination accepting portion 57 in CPU 111 accepts the transmission condition, and outputs the accepted transmission condition to communication control portion 67. Communication control portion 67 controls communication I/F portion 112 to transmit data according to the transmission condition input from output destination accepting portion 57. It is noted that in the case where switch key 301 is designated and a display device is designated as the output destination, the transmission-related information determined by output destination accepting portion 57 is output to communication control portion 67 in preference to the transmission condition.

Figure 9:
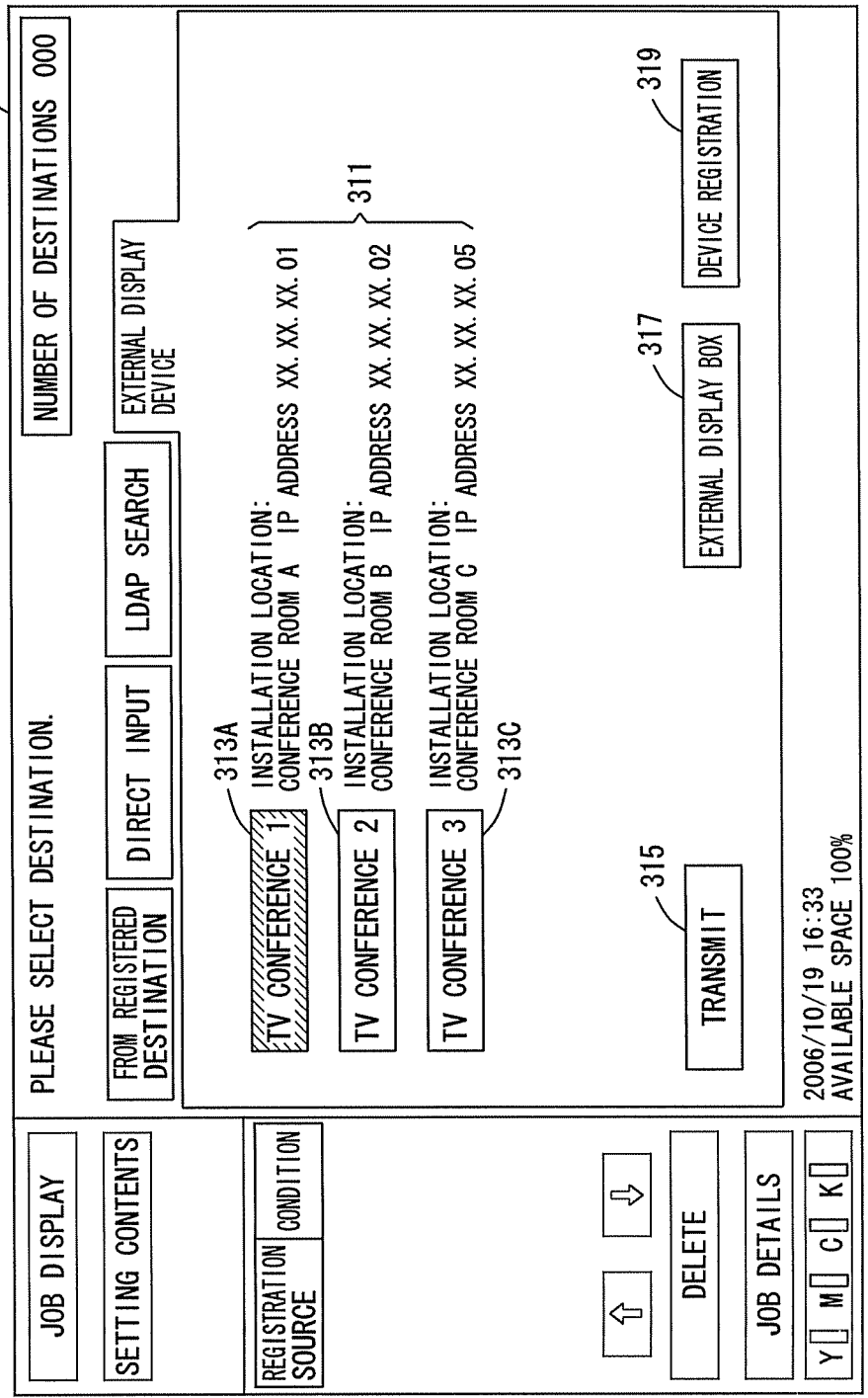
FIG. 9 shows an example of a display device designation screen.

FIG. 9 shows an example of the display device designation screen. Referring to FIG. 9, a display device designation screen 310 includes: an area 311 for displaying display devices and accepting selection; a transmission key 315 having the characters "transmit" displayed thereon; a key 317 having the characters "external device BOX" displayed thereon; and a key 319 having the characters "device registration" displayed thereon. Area 311 includes: three device selection keys 313A, 313B, and 313C, having three device names "TV conference 1", "TV conference 2", and "TV conference 3" respectively displayed thereon; and areas for displaying installation locations and IP addresses provided to the right of the respective device selection keys 313A, 313B, and 313C. Shown in the figure is the display device designation screen which is displayed in the case where only the television conference terminal devices 200, 200A, and 200B corresponding to the device names "TV conference 1", TV conference 2", and "TV conference 3", respectively, are in the state ready to display data, among the display devices registered in device information 93.

Device selection keys 313A, 313B, and 313C are the keys for selecting display devices. Of the plurality of display devices corresponding to the plurality of device records contained in device information 93, the device names of the display devices which are in the state ready to display data are displayed in a selectable manner. The key for selecting the display device in the state not ready to display data is not displayed and, hence, the user cannot select it, preventing a false selection. When the user designates at least one of device selection keys 313A, 313B, and 313C, the display device associated with the designated device selection key is selected. The designated one of device selection keys 313A, 313B, and 313C is displayed inverted, allowing the user to confirm the selected display device. In the figure, the inverted part is indicated by hatching.

Transmission key 315 is an output key for accepting an instruction to transmit data to the display device selected in area 311. Transmission key 315 is not displayed when none of device selection keys 313A, 313B, and 313C is selected, and is displayed in response to selection of at least one of them.

Key 317 having the characters "external display BOX" displayed thereon is a key for inputting an instruction to display a data designation screen for selecting the data stored in HDD 116. When the user designates key 317, the data designation screen is displayed.

Key 319 having the characters "device registration" displayed thereon is a key for accepting an instruction to display a device registration screen for registering a new display device. When the user designates key 319, the device registration screen is displayed.

Figure 10:
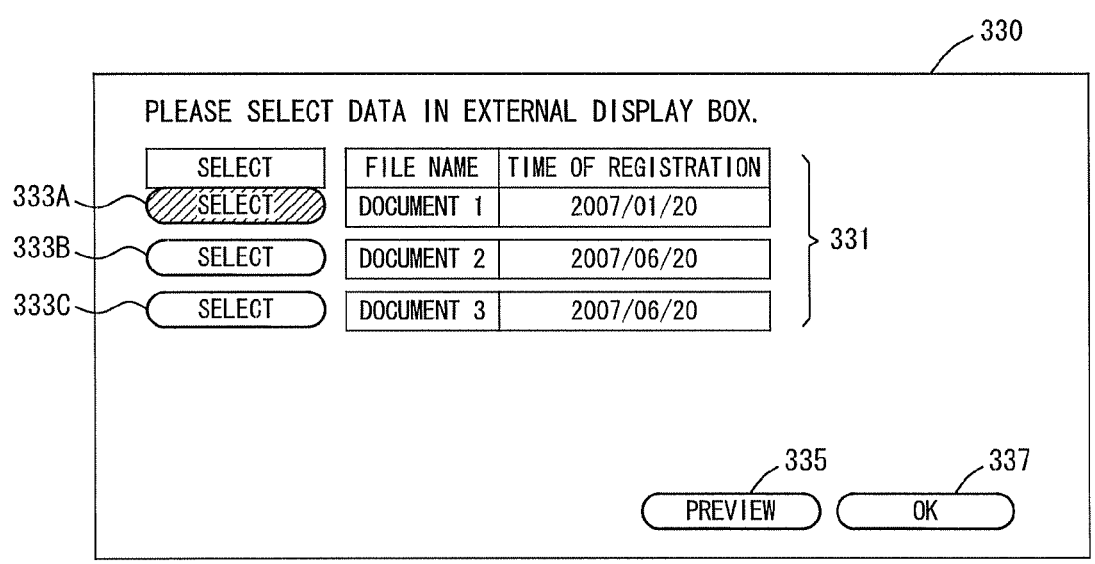
FIG. 10 shows an example of a data designation screen.

FIG. 10 shows an example of the data designation screen. Referring to FIG. 10, a data designation screen 330 includes: an area 331 for displaying file names of data 91 stored in an external display BOX which is one of a plurality of areas provided in HDD 116; a key 335 having the characters "preview" displayed thereon; and a key 337 having the characters "OK" displayed thereon. Area 331 has, in addition to the file names displayed, an area for displaying the date and time the data corresponding to a respective one of the file names was stored in the external display BOX on the right side of the corresponding file name, and data selection keys 333A, 333B, and 333C having the characters "select" displayed thereon on the left side of the respective file names.

Data selection keys 333A, 333B, and 333C are keys for selecting data to be transmitted to the display device, which keys are displayed corresponding to the data stored in the external display BOX. When the user designates at least one of data selection keys 333A, 333B, and 333C, the data of the file name associated with the designated data selection key is selected. The designated one of data selection keys 333A, 333B, and 333C is displayed inversed, allowing the user to confirm the selected file name of data. In the figure, the inverted part is indicated by hatching.

Key 335 is a key for accepting an instruction to display the selected data. When the user designates key 335, the data of the file name which is selected through designation of any of data selection keys 333A, 333B, and 333C is read from HDD 116 for display on display portion 161. This allows the user to confirm the content of the selected data. Key 337 is a key for accepting an instruction to confirm the selected data. When the user designates key 337, if one of data selection keys 333A, 333B, and 333C has been designated, the data of the file name corresponding to the designated data selection key is confirmed to be the selected data, and data designation screen 330 is no more displayed on display portion 161.

Figure 11:
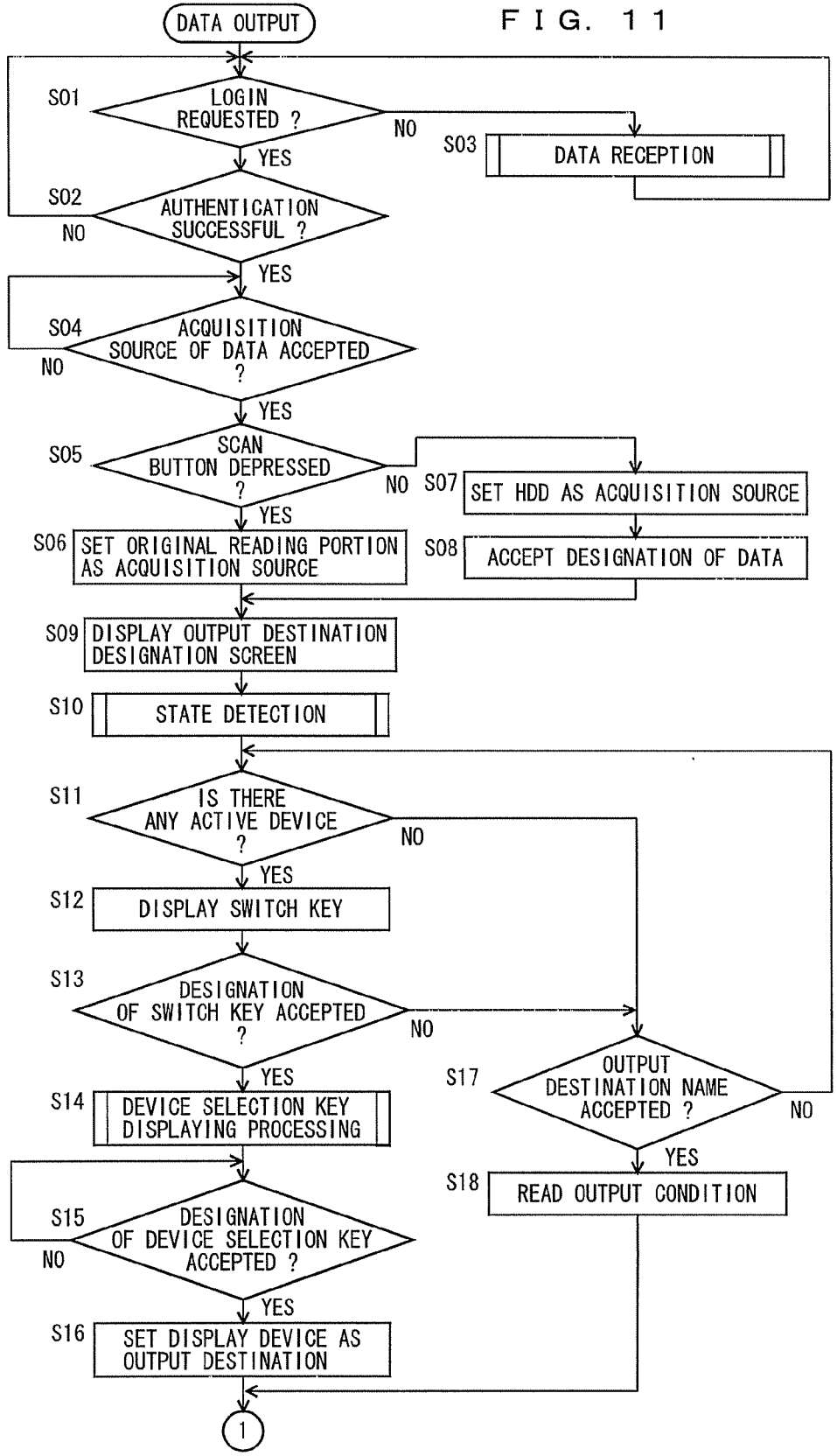
FIGS. 11 and 12 show a flowchart illustrating an example of the flow of data output processing.
Figure 12:
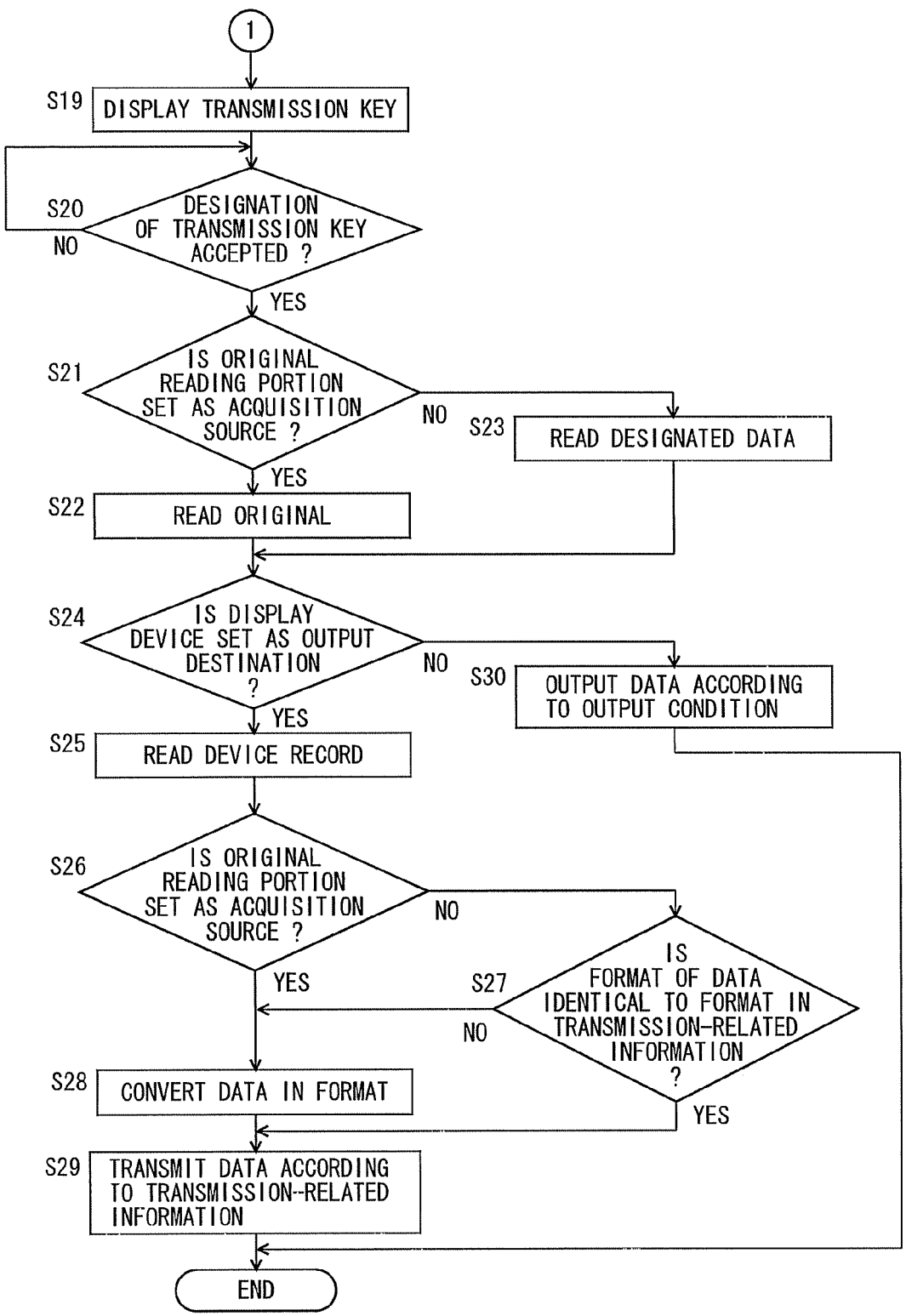

FIGS. 11 and 12 show a flowchart illustrating an example of the flow of data output processing. The data output processing is carried out by CPU 111 provided in MFP 100 as CPU 111 executes a data output program. Referring to FIGS. 11 and 12, CPU 111 determines whether a login request has been accepted (step S01). Determination as to whether the login request has been accepted is made based on whether a password serving as authentication information has been accepted. If the login request is accepted, the process proceeds to step S02; otherwise, the process proceeds to step S03. In step S03, data receiving processing is carried out, and the process returns to step S01. The data receiving processing will be described later in detail.

In step S02, authentication of the user requesting login is performed. CPU 111 accepts a set of user identification information and password input by the user to operation portion 163, and compares the accepted set with the sets of user identification information and passwords prestored in HDD 116. If the set of user identification information and password the same as the input set is stored in HDD 116, CPU 111 determines that the authentication is successful; otherwise, it determines that the authentication failed. If it is determined that the authentication is successful (YES in step S02), the process proceeds to step S04; otherwise, the process returns to step S01.

In step S04, it is determined whether an acquisition source of data has been accepted. CPU 111 is in a standby mode until accepting a data acquisition source (NO in step S04), and once it accepts the data acquisition source (YES in step S04), it moves the process to step S05. Here, it is determined that the data acquisition source is accepted when either scan key 163E or BOX key 163F provided in operation portion 163 is depressed.

In step S05, it is determined whether depression of scan key 163E provided in operation portion 163 has been detected. If so, the process proceeds to step S06; otherwise, the process proceeds to step S07. That is, the process proceeds to step S07 in response to detection of depression of BOX key 163F provided in operation portion 163.

In step S06, original reading portion 130 is set as the acquisition source of data, and the process proceeds to step S09. On the other hand, in step S07, HDD 116 is set as the acquisition source, and the process proceeds to step S08. In step S08, designation of data is accepted, and the process proceeds to step S09. Specifically, the data designation screen shown in FIG. 10 is displayed on display portion 161, and the file name corresponding to the data selection key designated by the user is accepted.

In step S09, the output destination setting screen shown in FIG. 8 is displayed on display portion 161. Then, state detecting processing is carried out (step S10), and the process proceeds to step S11. The state detecting processing, which will be described later in detail, is the processing of detecting whether the display devices registered in device information 93 prestored in HDD 116 are in the state ready to display data.

In step S11, it is determined, based on the results of the state detecting processing, whether the display devices registered in the device information includes at least one active device in the state ready to display data. If there is at least one active device, the process proceeds to step S12; otherwise, the process proceeds to step S17.

In step S12, a switch key is displayed on display portion 161. Since the output destination setting screen is being displayed on display portion 161, switch key 301 is displayed within the output destination setting screen displayed. It is then determined whether an operation to designate switch key 301 has been accepted (step S13). If operation portion 163 detects designation of switch key 301, the process proceeds to step S14; otherwise, the process proceeds to step S17. In step S14, device selection key displaying processing is carried out, and the process proceeds to step S15. The device selection key displaying processing, which will be described later in detail, is the processing of generating and displaying the display device designation screen shown in FIG. 9 on display portion 161. Display device designation screen 310 includes device selection keys 313A, 313B, and 313C.

In step S15, it is determined whether designation of at least one of device selection keys 313A, 313B, and 313C has been accepted. CPU 111 is in a standby mode until operation portion 163 detects designation of at least one of device selection keys 313A, 313B, and 313C included in display device designation screen 310 (NO in step S15), and once operation portion 163 detects the designation (YES in step S15), CPU 111 moves the process to step S16.

In step S16, the display device corresponding to the designated one of device selection keys 313A, 313B, and 313C is set as the output destination. If device selection key 313A is designated, television conference terminal device 200 is set as the output destination, if device selection key 313B is designated, television conference terminal device 200A is set as the output destination, and if device selection key 313C is designated, television conference terminal device 200B is set as the output destination.

On the other hand, in step S17, it is determined whether an output destination name included in output destination setting screen 300 has been accepted. If the output destination name is accepted, the process proceeds to step S18; otherwise, the process returns to step S11. Specifically, it is determined whether any of the output destination names displayed in area 303 in output destination setting screen 300 shown in FIG. 8 has been designated. If operation portion 163 accepts the output destination name displayed in area 303, the process proceeds to step S17.

In step S18, an output condition predetermined for the output destination corresponding to the accepted output destination name is read from HDD 116, and the process proceeds to step S19. The output conditions for the respective output destination names displayed in area 303 are prestored in HDD 116, and the corresponding one of them is read out here.

In step S19, a transmission key is displayed on display portion 161. Since the output destination setting screen is being displayed on display portion 161, transmission key 315 is displayed within the output destination setting screen displayed. It is then determined whether an operation to designate transmission key 315 has been accepted (step S20). CPU 111 is in a standby mode until operation portion 163 detects designation of transmission key 315 (NO in step S20), and once operation portion 163 detects the designation (YES in step S20), CPU 111 moves the process to step S21.

In step S21, it is determined whether the acquisition source accepted in step S04 is original reading portion 130. If so, the process proceeds to step S22; otherwise, the process proceeds to step S23. In step S22, CPU 111 controls original reading portion 130 to read an image of an original, and acquires the data which is output from original reading portion 130 that read the image of the original. In step S23, the data designated in step S08 is read from HDD 116. The process then proceeds to step S24.

In step S24, it is determined whether a display device has been set as the output destination. If the display device has been set as the output destination in step S16, the process proceeds to step S25; otherwise, the process proceeds to step S30.

In step S25, the device record containing the device name of the display device which was set as the output destination in step S16 is read from device information 93 stored in HDD 116. It is then determined whether the acquisition source is original reading portion 130 (step S26). If original reading portion 130 has been set as the acquisition source in step S06, the process proceeds to step S28; otherwise, the process proceeds to step S27.

The process proceeds to step S27 in the case where the data stored in HDD 116 has been designated in step S08. The data in HDD 116 are stored in various kinds of formats, and thus in step S27, it is determined whether the format of the data is identical to the one set in the field of specification in the device record read in step S25. If the format is identical to the one having been set, the process proceeds to step S29; otherwise, the process proceeds to step S28.

In step S28, the format of the data is converted to the one which is set in the field of specification in the device record read in step S25. The process proceeds directly from step S26 to step S28 in the case where the data output from original reading portion 130 that read the image of the original is acquired in step S22, and therefore, the acquired data is the data to be processed. In this case, the format of the data output from original reading portion 130 differs from the format which is set in the field of specification in the device record. Thus, the format of the data is converted to the format set in the field of specification in the device record.

In step S29, the data is transmitted via communication control portion 67 to the display device which was set as the output destination in step S16, in accordance with the transmission-related information set in the field of transmission-related information in the device record read in step S25. Specifically, in the case where FTP or SMB is set in the field of data transfer system in the device record, communication I/F portion 112 is caused to transmit the data to the IP address which is set in the field of IP address in the device record. In the case where SMTP is set in the field of data transfer system in the device record, an email is generated including the data and having the email address set in the field of path/mail address in the device record set as its destination, and communication I/F portion 112 is caused to transmit the generated email to email server 210. Further, in the case where Bluetooth®, IrDA, or IrSimple is set in the field of data transfer system in the device record, communication I/F portion 112 is caused to transmit the data according to the network path.

On the other hand, the process proceeds to step S30 when the output destination name is accepted in step S17. In step S30, the data is output according to the output condition read in step S18.

Figure 13:
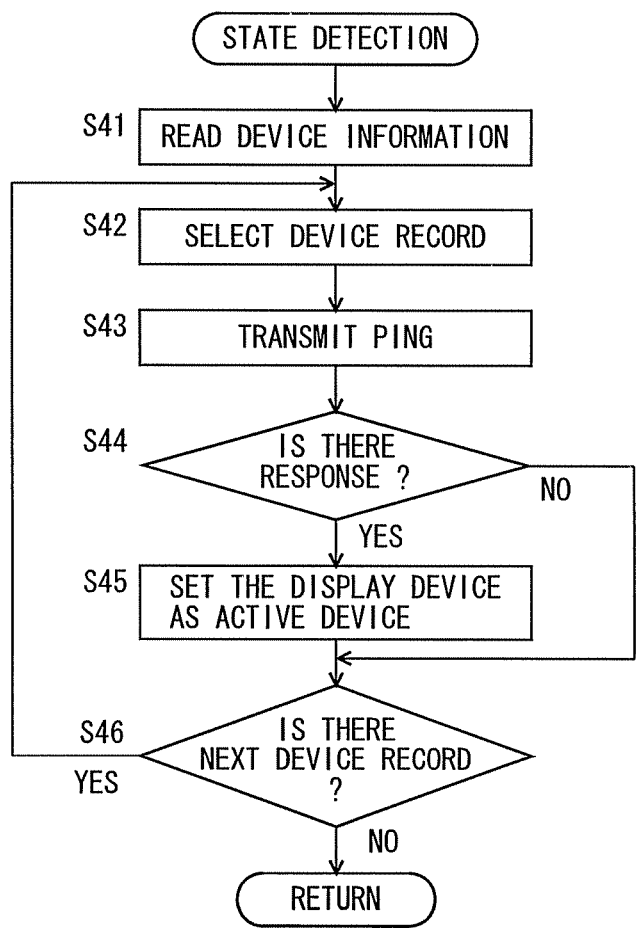
FIG. 13 is a flowchart illustrating an example of the flow of state detecting processing.

FIG. 13 is a flowchart illustrating an example of the flow of the state detecting processing. The state detecting processing is carried out in step S10 in FIG. 11. Referring to FIG. 13, CPU 111 reads device information 93 stored in HDD 116 (step S41). It then selects one of the device records included in the read device information 93 (step S42). Next, CPU 111 transmits a PING signal to the IP address set in the field of IP address in the selected device record, via communication I/F portion 112 (step S43).

In the following step S44, it is determined whether there is a reply to the signal transmitted in step S43. If the reply to the signal transmitted in step S43 is received, the process proceeds to step S45; otherwise, the process proceeds to step S46, with step S45 skipped.

In step S45, the display device of the device name set in the field of device name in the device record selected in step S42 is set as an active device, and the process proceeds to step S46. In step S46, it is determined whether there is a device record yet to be selected. If there is an unselected device record in device information 93, the process returns to step S42; otherwise, the process returns to the data output processing.

Figure 14:
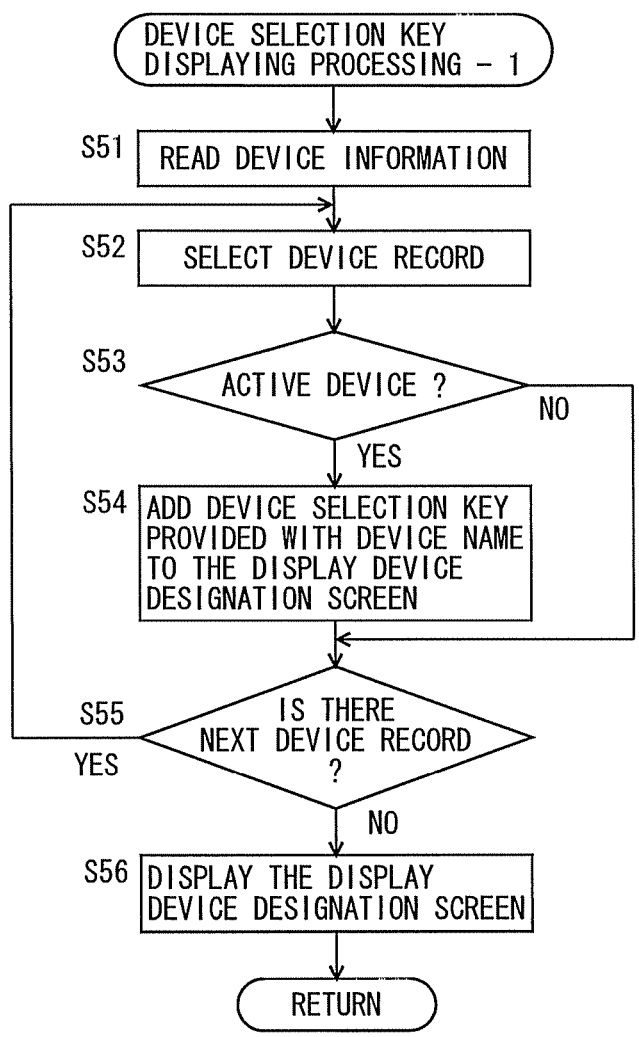
FIG. 14 is a flowchart illustrating an example of the flow of device selection key displaying processing.

FIG. 14 is a flowchart illustrating an example of the flow of the device selection key displaying processing. The device selection key displaying processing is carried out in step S14 in FIG. 11. Referring to FIG. 14, CPU 111 reads device information 93 stored in HDD 116 (step S51). It then selects one of the device records included in the read device information 93 (step S52). Next, it determines whether the display device corresponding to the selected device record is set to the active device (step S53). If the device is set to the active device, CPU 111 moves the process to step S54; otherwise, it moves the process to step S55, with step S54 skipped.

In step S54, a device selection key including the device name which is set in the field of device name in the device record selected in step S42 is added to display device designation screen 310, and the process proceeds to step S55. In step S55, it is determined whether there is a device record yet to be selected. If there is an unselected device record in device information 93, the process returns to step S52; otherwise, the process proceeds to step S56. In step S56, display device designation screen 310 is displayed on display portion 161, and the process returns to the data output processing.

Figure 15:
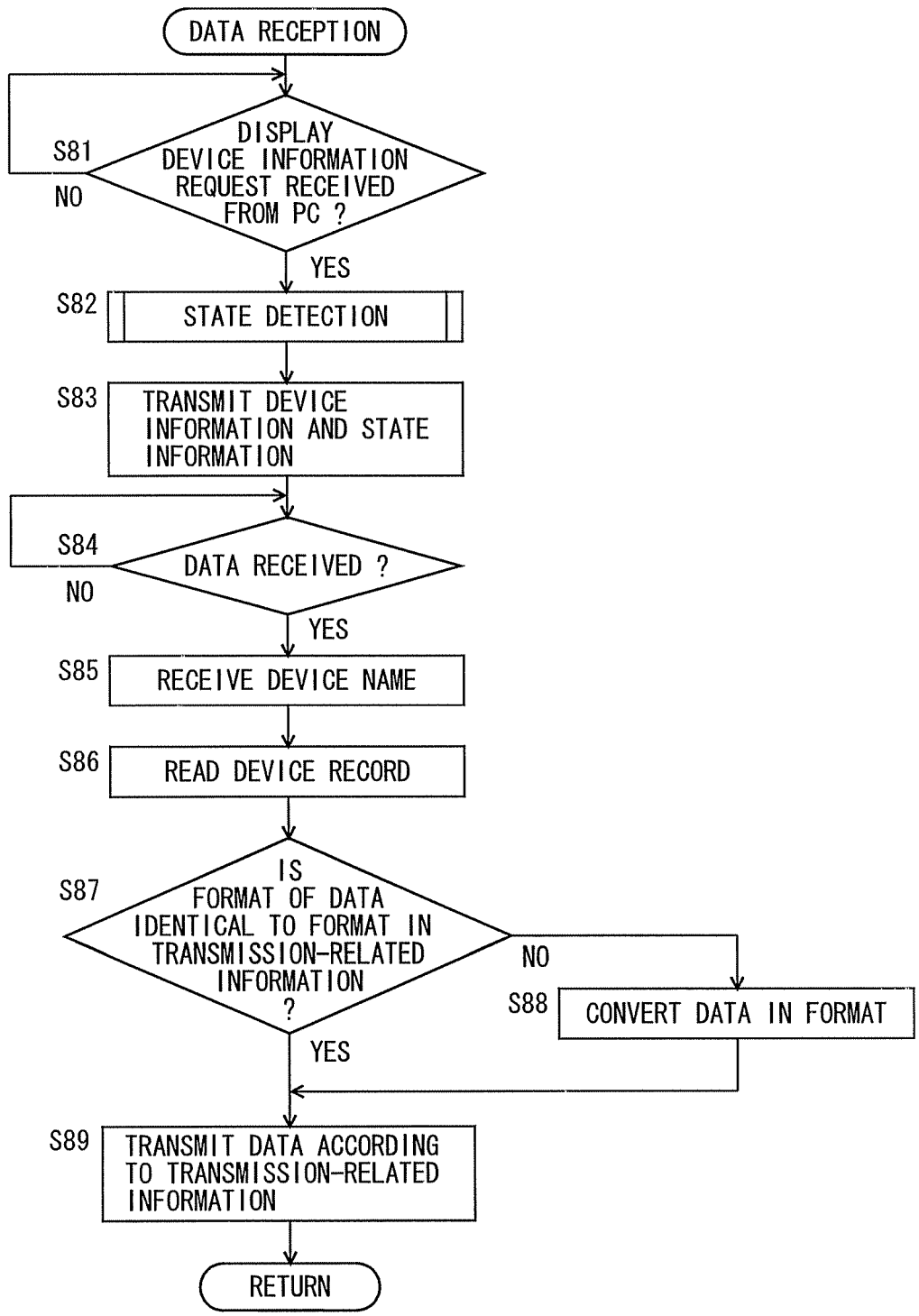
FIG. 15 is a flowchart illustrating an example of the flow of data receiving processing.

FIG. 15 is a flowchart illustrating an example of the flow of the data receiving processing. The data receiving processing is carried out in step S03 in FIG. 11. Referring to FIG. 15, CPU 111 determines whether a request for information of display device has been received from a PC (step S81). CPU 111 is in a standby mode until communication I/F portion 112 receives a device information request signal from any of PCs 251, 251A, and 251B (NO in step S81), and once it receives the device information request signal, CPU 111 moves the process to step S82. That is, the data receiving processing is carried out on the condition that the device information request signal is received from any of PCs 251, 251A, and 251B.

In step S82, the state detecting processing shown in FIG. 13 is carried out, and the process proceeds to step S83. In this case, if it is determined in step S46 in FIG. 13 that there is no device record yet to be selected, the process returns to the data receiving processing.

In step S83, device information 93 stored in HDD 116 and the state information indicating the states of the devices detected in the state detecting processing are transmitted to the PC that issued the display device information request signal.

Subsequently, CPU 111 is in a standby mode until it receives data from the PC that issued the display device information request signal (NO in step S84), and once it receives the data, it moves the process to step S85. In step S85, it receives the device name from the PC that transmitted the data. It then reads the device record containing the device name received in step S85 from device information 93 stored in HDD 116 (step S86).

For the data received from the PC, the format may not have been determined. Thus, in step S87, it is determined whether the format of the data is identical to the one set in the field of specification of the device record read in step S86. If the format is identical, the process proceeds to step S89; otherwise, the process proceeds to step S88. In step S88, the format of the data is converted to the one set in the field of specification in the device record read in step S86.

In step S89, the data is transmitted via communication control portion 67 to the display device having the device name that was received in step S85, in accordance with the transmission-related information set in the field of transmission-related information in the device record that was read in step S86. The process then returns to the data output processing.

CPU 111 carries out the data receiving processing only when the device information request signal is received from one of PCs 251, 251A, and 251B. Here, the case where the user of PC 251 causes PC 251 to transmit print data to television conference terminal device 200 will be described by way of example. In this case, PC 251 executes a pre-installed printer driver program for controlling MFP 100, and when the user of PC 251 inputs a print instruction to PC 251 with the data being selected, PC 251 displays a print designation screen on the display.

Figure 16:
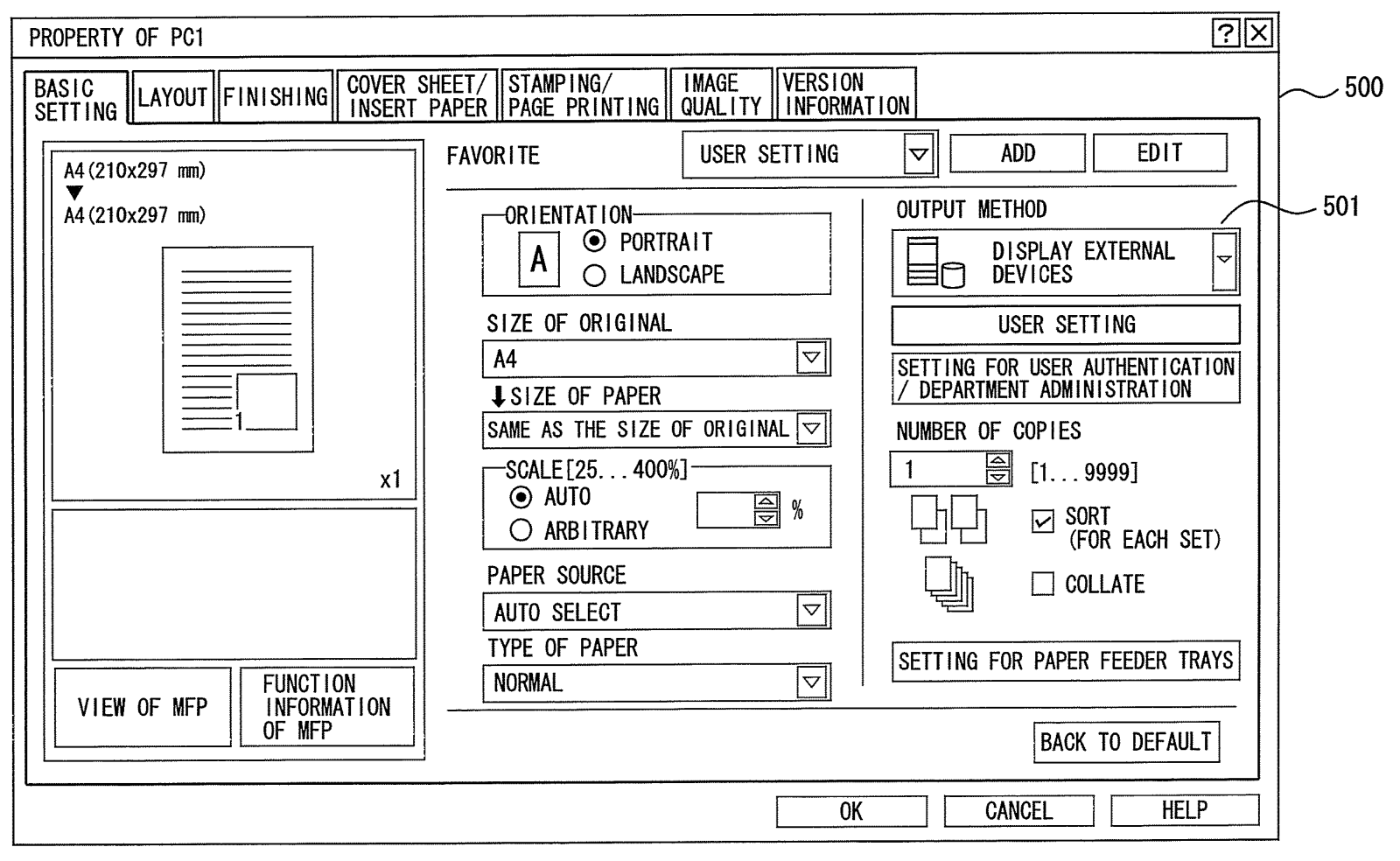

FIG. 16 shows an example of the print designation screen. Referring to FIG. 16, the print designation screen 500 includes an area for setting print conditions, and also includes an area 501 for setting an output method. When the user sets, in this area 501 for setting the output method, an "external device display" command for setting an instruction to output print data to a display device, PC 251 transmits a display device information request signal to MFP 100. In receipt of the display device information request signal, MFP 100 returns device information 93 and the state information, as described above. PC 251 receives device information 93 and the state information returned from MFP 100. PC 251 then generates a display device designation screen based on device information 93 and the state information, and displays it on the display. The processing of generating and displaying the display device designation screen based on device information 93 and the state information is identical to the device selection key displaying processing shown in FIG. 14, and thus, description thereof will not be repeated here.

FIG. 17 shows an example of the display device designation screen displayed on the PC. Referring to FIG. 17, the display device designation screen 510 differs from display device designation screen 310 shown in FIG. 9 in that an area 511 for displaying display devices for accepting selection includes device selection keys 513A to 513I displaying the device names of not only the display devices in the state ready to display data, but also those in the state not ready to display data, that area 511 displays more detailed information of the display devices, and that transmission key 315 and keys 317 and 319 are not provided.

Of device selection keys 513A to 513I, those having the device names corresponding to the display devices in the state ready to display data can be selected, while those having the device names corresponding to the display devices in the state not ready to display data cannot be selected. Whether each of device selection keys 513A to 513I is selectable or not is indicated by the display manner of the part of area 511 corresponding to that key. Specifically, the part of area 511 corresponding to the device selection key having the device name of the display device in the state ready to display data is displayed inverted and, hence, distinguished from the device selection key having the device name of the display device in the state not ready to display data. In the figure, the parts of area 511 corresponding respectively to device selection keys 513A, 513B, and 513F having the device names "TV conference 1", "TV conference 2", and "TV conference 3" displayed thereon are displayed inverted. This allows the user to confirm the selectable display devices. It also prevents an erroneous selection, because it is not possible to select the output device not in the state ready to display data. In the figure, the inverted parts are indicated by hatching.

When the user designates at least one of selectable device selection keys 513A, 513B, and 513F, the display device associated with the designated device selection key is selected. Upon designation of at least one of selectable device selection keys 513A, 513B, and 513F, the display manner of the designated key is switched to the inverted state, which allows the user to confirm the selected display device.

When the user designates the key having "OK" displayed thereon, PC 251 transmits the device name corresponding to the selected one of device selection keys 513A, 513B, and 513F, and the data to be printed, to MFP 100.

<First Modification>

FIG. 18 shows an example of the display device designation screen according to a first modification. A display device designation screen 320 in the first modification is displayed on display portion 161 in place of display device designation screen 310 shown in FIG. 9. Referring to FIG. 18, display device designation screen 320 of the first modification differs from display device designation screen 310 in that an area 321 for displaying display devices for accepting selection includes device selection keys 323A to 323I displaying the device names of not only the display devices in the state ready to display data, but also those in the state not ready to display data, and that area 321 displays more detailed information of the display devices.

Of device selection keys 323A to 323I, those having the device names corresponding to the display devices in the state ready to display data can be selected, while those having the device names corresponding to the display devices in the state not ready to display data cannot be selected. Whether each of device selection keys 323A to 323I is selectable or not is indicated by the display manner of the part of area 321 corresponding to that key. Specifically, the part of area 321 corresponding to the device selection key having the device name of the display device in the state ready to display data is displayed inverted and, hence, distinguished from the device selection key having the device name of the display device in the state not ready to display data. In the figure, the parts of area 321 corresponding respectively to device selection keys 323A, 323B, and 323F having the device names "TV conference 1", "TV conference 2", and "TV conference 3" displayed thereon are displayed inverted. This allows the user to confirm the selectable display devices. It also prevents an erroneous selection, because it is not possible to select the output device not in the state ready to display data. In the figure, the inverted parts are indicated by hatching.

When the user designates at least one of selectable device selection keys 323A, 323B, and 323F, the display device associated with the designated device selection key is selected. Upon designation of at least one of selectable device selection keys 323A, 323B, and 323F, the display manner of the designated key is switched to the inverted state, which allows the user to confirm the selected display device.

<Second Modification>

A display device selection screen according to a second modification differs from the display device selection screen shown in FIG. 9 in that it is configured to display a device selection key that can be used to select a display device which is used for a conference the user participates in. Here, the case where television conference terminal device 200A installed in conference room B is being used for the conference that user A is participating in will be described by way of example.

FIG. 19 is a functional block diagram showing an example of the functions of the CPU provided in the MFP according to the second modification, together with information stored in the HDD. The functional block diagram in FIG. 19 differs from that in FIG. 6 in that the device selection key display portion 61A in CPU 111 has been modified, and that a user authentication portion 71 and a conference information acquiring portion 73 have been added. Otherwise, the configuration is as described above, and thus, description thereof will not be repeated here.

User authentication portion 71 accepts a set of user identification information and password input to operation portion 163 by the user, and compares the accepted set with the sets of user identification information and passwords pre-stored in HDD 116. If the set of user identification information and password identical to the accepted set is stored in HDD 116, it determines that authentication is successful; otherwise, it determines that the authentication failed. If the authentication is successful, user authentication portion 71 outputs the accepted user identification information to conference information acquiring portion 73.

Conference information acquiring portion 73 acquires conference information. The conference information may be pre-stored in HDD 116 in MFP 100, or in the case where a conference management server is connected to network 2, the conference information may be acquired from the conference management server via communication I/F portion 112. Further, the authenticated user may input the information from operation portion 163.

FIG. 20 shows an example of the format of the conference information. Referring to FIG. 20, the conference information includes a conference name, a conference room name, and participant user identification information. In the field of conference name, the name for identification of the conference is set. In the field of conference room name, the name of the location where the conference is held is set. In the field of participant user identification information, the user identification information for identification of the user participating in the conference is set. The participant user identification information is set for each of the users who participate in the conference.

When the user identification information is input from user authentication portion 71, conference information acquiring portion 73 extracts the conference information having the received user identification information set in its field of participant user identification information, and outputs the name of the location set in the field of conference room name in the extracted conference information, to device selection key display portion 61A.

Device selection key display portion 61A generates a display device designation screen based on the states of the display devices input from state detecting portion 63 and the name of the location input from conference information acquiring portion 73, and displays the display device designation screen on display portion 161. Specifically, it reads device information 93 from HDD 116, and extracts the device records including the IP addresses of the devices which are determined to be in the active state according to the states of the display devices input from state detecting portion 63. Further, it selects, from the extracted device records, the one having the information identical to the name of the location input from conference information acquiring portion 73 set in its field of installation location. It then displays the display device designation screen which includes the device name included in the selected device record. This allows the user to select the display device installed in the location where the conference in which the user is currently participating is held. When the user inputs an operation to select the displayed device name to operation portion 163, device selection key display portion 61A displays a transmission key on display portion 161. The transmission key is the output key for accepting the instruction to transmit the data to the selected display device. When the user inputs the operation to designate the transmission key to operation portion 163, output destination accepting portion 57 outputs the selected device name to conversion portion 65 and communication control portion 67.

Figure 21:
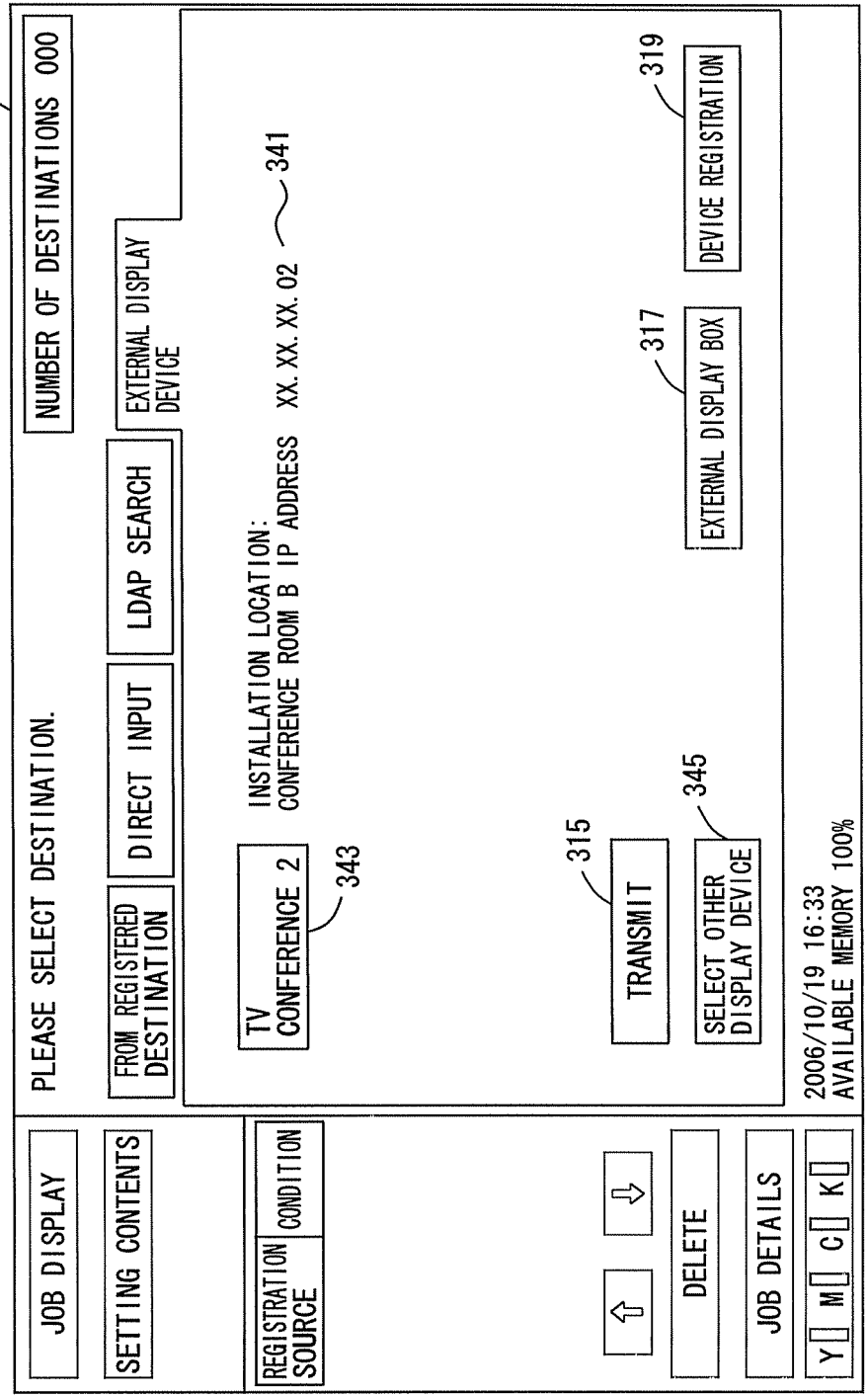
FIG. 21 shows an example of the display device designation screen in the second modification.

FIG. 21 shows an example of the display device designation screen according to the second modification. The display device designation screen 340 in the second modification is displayed on display portion 161 instead of display device designation screen 310 shown in FIG. 9. Referring to FIG. 21, display device designation screen 340 of the second modification differs from display device designation screen 310 in that an area 341 for displaying the display device for accepting selection has displayed therein the information of the display device which is installed in the location where the conference in which the user that logged in MFP 100 is participating is being held, that area 341 includes only one device selection key 343 having the device name of that display device displayed thereon, and that area 341 includes a key 345 having the characters "select other display device" displayed thereon. Otherwise, the display is identical to that of display device designation screen 310, and thus, description thereof will not be repeated here. As described above, display device designation screen 340 displays only the device selection key 343 having the device name of the display device which is installed in the location where the conference in which the user who logged into MFP 100 is participating is held, which prevents the user's erroneous selection of a display device.

Key 345 having the characters "select other display device" is the key for accepting an instruction to display a screen for selecting a display device other than the one which is installed in the location where the conference in which the user who logged into MFP 100 is participating is being held. When key 345 is designated, the display device designation screen shown in FIG. 9 or FIG. 18 is displayed.

While the case where the conference in which the user who logged into MFP 100 is participating is held in conference room B has been described here, in the case where a television conference is held over a plurality of conference rooms, the device names of a plurality of display devices which are installed in the respective conference rooms are displayed in a selectable manner. In such a case, the user may designate all the device names to select all the display devices, or may select one or more of them.

Figure 22:
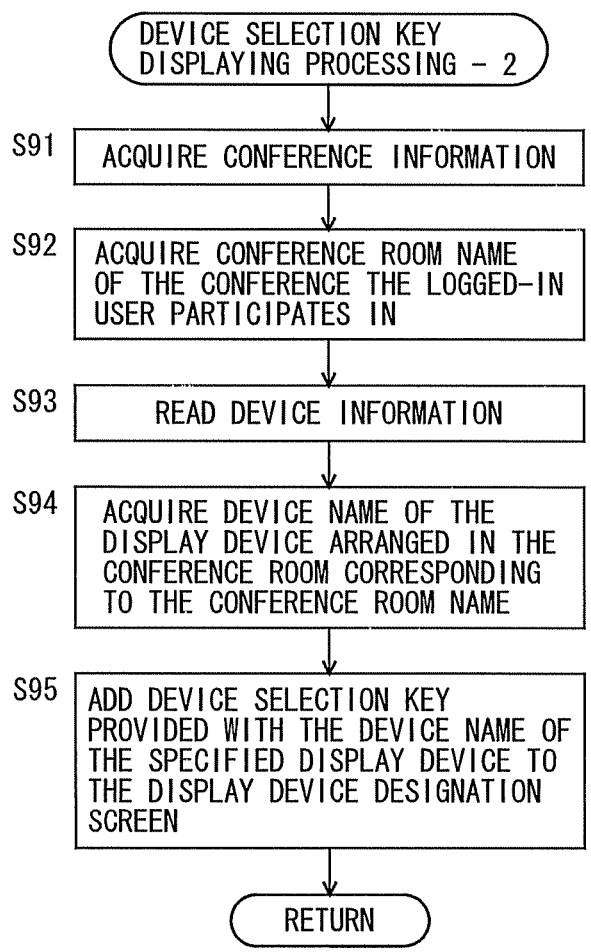
FIG. 22 is a flowchart illustrating an example of the flow of the device selection key displaying processing in the second modification.

FIG. 22 is a flowchart illustrating an example of the flow of the device selection key displaying processing according to the second modification. The device selection key displaying processing is carried out in step S14 in FIG. 11. Referring to FIG. 22, CPU 111 acquires conference information (step S91). If the conference information is prestored in HDD 116 in MFP 100, it reads the conference information from HDD 116. If there is a conference management server connected to network 2, it acquires the conference information from the conference management server via communication I/F portion 112.

CPU 111 then acquires the conference room name of the conference in which the logged-in user participates (step S92). Specifically, of the conference information acquired in step S91, the conference information having the user identification information of the logged-in user set in the field of participant user identification information is extracted, and the name of the location set in the field of conference room name in the extracted conference information is acquired as the conference room name of the conference in which the logged-in user participates.

Next, CPU 111 reads device information 93 from HDD 116 (step S93), selects the device record having the information the same as the conference room name acquired in step S92 set in the field of installation location, and acquires the device name included in the selected device record (step S94). Further, in step S95, it adds a device selection key including the device name acquired in step S94 to display device designation screen 340, and it returns the process to the data output processing.

As described above, in television conference system 1 according to the present embodiment, MFP 100 is connected to television conference terminal devices 200, 200A, and 200B via network 2, and stores device information 93 in HDD 116. When one of television conference terminal devices 200, 200A, and 200B is accepted as an output destination device which is the output destination of data, the format of the data is converted to the format which is set in the field of specification in the device record corresponding to the output destination device included in device information 93, and the resultant data is output to the output destination device. This enables the data to be displayed on the output destination device only with the operations of inputting data and designating the output destination of the data.

Further, MFP 100 detects the respective states of television conference terminal devices 200, 200A, and 200B, and displays switch key 301 in output destination setting screen 300 on the condition that it is detected that at least one of television conference terminal devices 200, 200A, and 200B is in the communicable state. If none of television conference terminal devices 200, 200A, and 200B is in the communicable state, switch key 301 is not displayed, thereby preventing erroneous selection of any of television conference terminal devices 200, 200A, and 200B which is not in the communicable state.

In response to designation of switch key 301, at least one device selection key, 313A, 313B, 313C, is displayed corresponding respectively to at least one of television conference terminal devices 200, 200A, and 200B which is detected to be in the communicable state, enabling selection of the corresponding active device as the output destination of data. This allows the user to easily select the output destination of data.

Further, the respective states of television conference terminal devices 200, 200A, and 200B are detected, and on the condition that at least one active device among television conference terminal devices 200, 200A, and 200B is detected to be in the communicable state, at least one device selection key is displayed corresponding respectively to the at least one active device, to enable selection of the corresponding device as the output destination of data. This allows the user to easily select the output destination of data. If none of television conference terminal devices 200, 200A, and 200B is in the communicable state, the device selection key is not displayed, which prevents erroneous selection of television conference terminal device 200, 200A, or 200B that is in the non-communicable state.

Furthermore, in device information 93, the device names for identification of respective ones of television conference terminal devices 200, 200A, and 200B are associated with the conference room names for identification of the locations where the respective devices are installed, and the device selection key is displayed to allow selection of the display device which is installed in the conference room in which the conference that the user permitted to log in is participating in is being held. This prevents erroneous selection of the output destination device from among the plurality of display devices which is installed in the conference room where the conference that the user is not participating in is being held.

Furthermore, transmission key 315 is displayed in response to the event that one of television conference terminal devices 200, 200A, and 200B is accepted as an output destination device corresponding to the output destination of data. This can prevent a false operation, and also inform the user of the operating procedure.

Still further, MFP 100, which is connected to television conference terminal devices 200, 200A, and 200B, is the data processing apparatus connected to a display device displaying images, and includes: a device information storage portion to store, for the display device, specification of data in accordance with which the display device can display data; a selection portion to select one of a plurality of data sources; a data acquiring portion to acquire data from the selected one of the plurality of data sources; an output destination accepting portion to accept an output destination of data; a conversion portion, when the display device is accepted as the output destination of data, to convert a specification of the acquired data to the specification stored for the display device in the device information storage portion; and an output portion to output the data converted by the conversion portion to the display device.

According to this aspect, in the case where data is acquired from a selected one of original reading portion 130, HDD 116, and communication I/F portion 112, and television conference terminal device 200 is accepted as the output destination of the data, the format of the data is converted to the one set in the field of specification of the device record corresponding to television conference terminal device 200 included in device information 93, and the converted data is output to television conference terminal device 200. This allows the input data to be displayed on television conference terminal device 200, irrespective of the format of the input data. As a result, it is possible to cause the data to be displayed on television conference terminal device 200 only with the operation of inputting the data to the MFP and the operation of designating television conference terminal device 200 as the output destination.

While television conference system 1 has been described in the above embodiment, the present invention may of course be understood as a data output method for carrying out the processing shown in FIGS. 11-15 and 22, or a data output program for causing a computer to carry out the data output method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus connected to a plurality of display devices displaying data, the data processing apparatus comprising:
   a device information storage portion to store, for each of said plurality of display devices, specification of data in accordance with which the corresponding display device can display data;
   a data acquiring portion to acquire data;
   an output destination accepting portion to accept an output destination of data;
   a conversion portion, when one of said plurality of display devices is designated as an output destination device which is the output destination of data, to convert specification of said acquired data to said specification stored corresponding to said output destination device in said device information storage portion;
   an output portion to output the data converted by said conversion portion to said output destination device;
   an arrangement information storage portion to store arrangement information associating a plurality of pieces of device identification information for identification of each of said plurality of display devices with a plurality of pieces of conference room identification information, the arrangement information identifying which of said plurality of display devices are arranged within each of a plurality of conference rooms;
   an authentication portion for authentication of a user; and
   a conference information acquiring portion to acquire conference information including the conference room identification information of the conference room in which a conference is held and a plurality of pieces of user identification information for identification of all the users participating in the conference;
   wherein when the user identification information of said authenticated user is included in said acquired conference information,
      said output destination accepting portion displays a device selection key which enables one of said plurality of display devices that is associated with said conference room identification information included in said acquired conference information by said arrangement information to be selected as the output destination of data,
      said output destination accepting portion also displays a select other device key for displaying a screen for selecting one of the plurality of display devices that are not associated with said conference room identification information included in said acquired conference information by said arrangement information, and
      unless said select other device key is selected, said output destination accepting portion does not display other device selection keys to select said plurality of display devices that are not associated with said conference room identification information included in said acquired conference information by said arrangement information.

2. The data processing apparatus according to claim 1, further comprising a state detecting portion to detect respective states of said plurality of display devices, wherein
   said output destination accepting portion includes a switch key display portion to display a switch key for switching one of said plurality of display devices to a state in which the display device can be selected as the output destination of data on the condition that said state detecting portion detects that at least one of said plurality of display devices is in a communicable state.

3. The data processing apparatus according to claim 2, wherein said output destination accepting portion includes a device selection key display portion to display at least one device selection key in response to designation of said switch key, said at least one device selection key corresponding respectively to at least one active device among said plurality of display devices that is detected to be in the communicable state by said state detecting portion and enabling selection of the corresponding active device as the output destination of data.

4. The data processing apparatus according to claim 1, further comprising a state detecting portion to detect respective states of said plurality of display devices, wherein
   said output destination accepting portion includes a device selection key display portion to display at least one device selection key on the condition that said state detecting portion detects that at least one active device among said plurality of display devices is in a communicable state, said at least one device selection key corresponding respectively to said at least one active device and enabling selection of the corresponding active device as the output destination of data.

5. The data processing apparatus according to claim 1, wherein said output destination accepting portion displays an output key for accepting an instruction to said output portion to output data, in response to the event that one of said plurality of display devices is designated as an output destination device which is the output destination of data.

6. The data processing apparatus according to claim 1, wherein
   said device information storage portion further stores transmission-related information for use in transmission of data for each of said plurality of display devices, and
   said output portion transmits said converted data in accordance with said transmission-related information stored corresponding to said output destination device in said device information storage portion.

7. The data processing apparatus according to claim 1, further comprising:
   a data storage portion to store data; and
   a designation accepting portion to accept designation of the data stored in said data storage portion, wherein
   said data acquiring portion acquires from said data storage portion the data specified by said accepted designation, and
   in the case where specification of said acquired data is identical to the specification stored corresponding to said output destination device by said device information storage portion, said output portion outputs said acquired data to said output destination device, and in the case where the specification of said acquired data is not identical to the specification stored corresponding to said output destination device by said device information storage portion, said output portion outputs the data converted by said conversion portion to said output destination device.

8. The data processing apparatus according to claim 1, further comprising an original reading portion to read an image formed on an original to output data, wherein
said data acquiring portion acquires the data output by said original reading portion.

9. The data processing apparatus according to claim 1, further comprising a data receiving portion to externally receive data, wherein
said data acquiring portion acquires the data received by said data receiving portion, and
said output destination accepting portion accepts a display device identified by device identification information received together with said data as the output destination of the data.

10. The data processing apparatus according to claim 1, wherein said specification of data defines a format of the data.

11. A data processing apparatus connected to a display device displaying images, the data processing apparatus comprising:
a device information storage portion to store, for said display device, specification of data in accordance with which said display device can display data;
a selection portion to select one of a plurality of data sources;
a data acquiring portion to acquire data from the selected one of said plurality of data sources;
an output destination accepting portion to accept an output destination of data;
a conversion portion, when said display device is accepted as the output destination of data, to convert specification of said acquired data to said specification stored corresponding to said display device in said device information storage portion;
an output portion to output the data converted by said conversion portion to said display device;
an arrangement information storage portion to store arrangement information associating a plurality of pieces of device information for identification of said display device with a plurality of pieces of conference room identification information, the arrangement information identifying which of a plurality of conference rooms said display device is arranged within;
an authentication portion for authentication of a user; and
a conference information acquiring portion to acquire conference information including the conference room identification information of the conference room in which a conference is held and a plurality of pieces of user identification information for identification of all the users participating in the conference;
wherein when the user identification information of said authenticated user is included in said acquired conference information,
said output destination accepting portion displays a device selection key which enables said display device that is associated with said conference room identification information included in said acquired conference information by said arrangement information to be selected as the output destination of data,
said output destination accepting portion also displays a select other device key for displaying a screen for selecting one of the plurality of display devices that are not associated with said conference room identification information included in said acquired conference information by said arrangement information, and
unless said select other device key is selected, said output destination accepting portion does not display said device selection keys to select said display devices that are not associated with said conference room identification information included in said acquired conference information by said arrangement information.

12. The data processing apparatus according to claim 11, further comprising:
an original reading portion to read an image of an original to output data;
a data receiving portion to receive data; and
a data storage portion to store data; wherein
said data acquiring portion acquires the data output from said original reading portion in the case where said original reading portion is selected as an acquisition source of data, and acquires the data output from said data receiving portion in the case where said data receiving portion is selected as the acquisition source of data, and in the case where said data storage portion is selected as the acquisition source of data, said data acquiring portion accepts designation of the data stored in said data storage portion and acquires the data specified by said accepted designation from said data storage portion.

13. The data processing apparatus according to claim 11, wherein said specification of data defines a format of the data.

14. A data output method carried out by a data processing apparatus connected to a plurality of display devices displaying images,
said data processing apparatus including a device information storage portion to store, for each of said plurality of display devices, specification of data in accordance with which the corresponding display device can display data,
the method comprising the steps of:
acquiring data;
accepting an output destination of data;
in the case where one of said plurality of display devices is designated as an output destination device which is the output destination of data, converting specification of said acquired data to said specification stored corresponding to said output destination device;
outputting said converted data to said output destination device;
storing arrangement information associating a plurality of pieces of device identification information for identification of each of said plurality of display devices with a plurality of pieces of conference room identification information, the arrangement information identifying which of said plurality of display devices are arranged within each of a plurality of conference rooms;
performing authentication of a user; and
acquiring conference information including conference room identification information for identification of the conference room in which a conference is held and a plurality of user identification information for identification of all the users participating in the conference;
wherein when the user identification information of said authenticated user is included in said acquired conference information, said step of accepting the output destination of data includes
the step of displaying a device selection key which enables one of said plurality of display devices that is associated with said conference room identification information included in said acquired conference information by said arrangement information to be selected as the output destination of data,
the step of also displaying a select other device key for displaying a screen for selecting one of the plurality of display devices that are not associated with said conference room identification information included in said acquired conference information by said arrangement information, and unless said select other key is selected, not displaying other device selection keys to select said plurality of display devices that are not associated with said conference room identification information included in said acquired conference information by said arrangement information.

15. The data output method according to claim 14, further comprising the step of detecting respective states of said plurality of display devices, wherein
said step of accepting the output destination of data includes the step of, on the condition that at least one of said plurality of display devices is detected to be in a communicable state in said step of detecting the states, displaying a switch key for switching one of said plurality of display devices to a state in which the display device can be selected as the output destination of data.

16. The data output method according to claim 15, wherein said step of accepting the output destination of data includes the step of, in response to designation of said switch key, displaying at least one device selection key which corresponds respectively to at least one active device among said plurality of display devices that is detected to be in the communicable state in said step of detecting the states and which enables the corresponding active device to be selected as the output destination of data.

17. The data output method according to claim 14, further comprising the step of detecting respective states of said plurality of display devices, wherein
said step of accepting the output destination of data includes the step of, on the condition that at least one active device among said plurality of display devices is detected to be in a communicable state in said step of detecting the states, displaying at least one device selection key which corresponds respectively to said at least one active device and which enables selection of the corresponding active device as the output destination of data.

18. The data output method according to claim 14, wherein said step of accepting the output destination of data includes the step of displaying an output key for accepting an instruction to output data in said outputting step, in response to acceptance of one of said plurality of display devices as an output destination device which is the output destination of data.

19. The data output method according to claim 14, wherein
said device information storage portion further stores transmission-related information for use in transmitting data for a respective one of said plurality of display devices, and
said outputting step includes the step of transmitting said converted data in accordance with said transmission-related information stored corresponding to said output destination device.

20. The data output method according to claim 14, further comprising the step of:
storing data; and
accepting designation of said stored data; wherein
said step of acquiring data includes the step of acquiring the data specified by said accepted designation from said stored data, and
said outputting step includes the steps of:
outputting said acquired data to said output destination device in the case where specification of said acquired data is identical to the specification stored corresponding to said output destination device in said device information storage portion, and
outputting the data converted in said converting step to said output destination device in the case where the specification of said acquired data is not identical to the specification stored corresponding to said output destination device in said device information storage portion.

21. The data output method according to claim 14, further comprising the step of reading an image formed on an original to output data, wherein
said step of acquiring data includes the step of acquiring the data output in said step of reading the image of the original.

22. The data output method according to claim 14, further comprising the step of externally receiving data, wherein
said step of acquiring data includes the step of acquiring the data received in said step of externally receiving data, and
said step of accepting the output destination of data includes the step of accepting a display device identified by device identification information received together with said data as the output destination of the data.

23. The data output method according to claim 14, wherein said specification of data defines a format of the data.

24. A data output method carried out by a data processing apparatus connected to a display device displaying images,
said data processing apparatus including a device information storage portion to store, for said display device, specification of data in accordance with which said display device can display data,
the method comprising the steps of:
accepting selection of one of a plurality of data sources;
acquiring data from the selected one of said plurality of data sources;
accepting an output destination of data;
in the case where said display device is accepted as the output destination of data, converting specification of said acquired data to said specification corresponding to said display device;
outputting said converted data to said display device;
storing arrangement information which associates device identification information for identification of said display device with a plurality of pieces of conference room identification information, the arrangement information identifying which of a plurality of conference rooms said display device is arranged within;
performing authentication of a user; and
acquiring conference information including conference room identification information for identification of the conference room in which a conference is held and a plurality of user identification information for identification of all the users participating in the conference;
wherein when the user identification information of said authenticated user is included in said acquired conference information, said step of accepting the output destination of data includes
the step of displaying a device selection key which enables said display device that is associated with said conference room identification information included in said acquired conference information by said arrangement information to be selected as the output destination of data,
the step of also displaying a select other device key for displaying a screen for selecting one of the plurality of display devices that are not associated with said conference room identification information included in said acquired conference information by said arrangement information, and unless said select other device key is selected, not displaying other device selection keys to select said plurality of display devices that are not associated with said conference room identification information included in said acquired conference information by said arrangement information.

25. The data output method according to claim 24, further comprising the steps of:

reading an image of an original to output data;
receiving data; and
storing data; wherein
said step of acquiring data includes the steps of:
in the case where an instruction to read said original is accepted as an acquisition source of data, acquiring the data output in said step of reading the image of the original,
in the case where said received data is designated as the acquisition source of data, acquiring the data output in said step of receiving data, and
in the case where said stored data is designated as the acquisition source of data, accepting designation of the data stored in said step of storing data, and acquiring the data specified by said accepted designation from said stored data.

26. The data output method according to claim 24, wherein said specification of data defines a format of the data.

27. A data output program embodied on a non-transitory computer readable medium and executed by a computer controlling a data processing apparatus connected to a plurality of display devices displaying images, said data processing apparatus including a device information storage portion to store, for each of said plurality of display devices, specification of data in accordance with which the corresponding display device can display data, the program causing the computer to execute the steps of:
acquiring data;
accepting an output destination of data;
in the case where one of said plurality of display devices is designated as an output destination device which is the output destination of data, converting specification of said acquired data to said specification stored corresponding to said output destination device;
outputting said converted data to said output destination device;
storing arrangement information which associates a plurality of pieces of device identification information for identification of each of said display devices with a plurality of pieces of conference room identification information, the arrangement information identifying which of said plurality of display devices are arranged within each of a plurality of conference rooms;
performing authentication of a user; and
acquiring conference information including conference room identification information for identification of the conference room in which a conference is held and a plurality of user identification information for identification of all the users participating in the conference;
wherein when the user identification information of said authenticated user is included in said acquired conference information, said step of accepting the output destination of data includes
the step of displaying a device selection key which enables one of said plurality of display devices that is associated with said conference room identification information included in said acquired conference information by said arrangement information to be selected as the output destination of data, the step of also displaying a select other device key for displaying a screen for selecting one of the plurality of display devices that are not associated with said conference room identification information included in said acquired conference information by said arrangement information, and unless said select other device key is selected, not displaying other device selection keys to select said plurality of display devices that are not associated with said conference room identification information included in said acquired conference information by said arrangement information.

28. The data output program embodied on the non-transitory computer readable medium according to claim 27, wherein said specification of data defines a format of the data.

29. A data output program embodied on a non-transitory computer readable medium and executed by a computer controlling a data processing apparatus connected to a display device displaying images, said data processing apparatus including a device information storage portion to store, for said display device, specification of data in accordance with which said display device can display data, the program causing the computer to execute the steps of:
accepting selection of one of a plurality of data sources;
acquiring data from the selected one of said plurality of data sources;
accepting an output destination of data;
in the case where said display device is accepted as the output destination of data, converting specification of said acquired data to said specification stored corresponding to said display device;
outputting said converted data to said display device;
storing arrangement information which associates device identification information for identification of said display device with a plurality of pieces of conference room identification information, the arrangement information identifying which of a plurality of conference rooms said display device is arranged within;
performing authentication of a user; and
acquiring conference information including conference room identification information for identification of the conference room in which a conference is held and a plurality of user identification information for identification of all the users participating in the conference;
wherein when the user identification information of said authenticated user is included in said acquired conference information, said step of accepting the output destination of data includes
the step of displaying a device selection key which enables said display device that is associated with said conference room identification information included in said acquired conference information by said arrangement information to be selected as the output destination of data, the step of also displaying a select other device key for displaying a screen for selecting one of the plurality of display devices that are not associated with said conference room identification information included in said acquired conference information by said arrangement information, and unless said select other device key is selected, not displaying other device selection keys to select said plurality of display devices that are not associated with said conference room identification information included in said acquired conference information by said arrangement information.

30. The data output program embodied on the non-transitory computer readable medium according to claim 29, wherein said specification of data defines a format of the data.

* * * * *